(12) United States Patent
Vaios

(10) Patent No.: US 11,506,331 B2
(45) Date of Patent: Nov. 22, 2022

(54) MODULAR TRUSSED SUSPENDED PLATFORM

(71) Applicant: Bozikis Vaios, Moraga, CA (US)

(72) Inventor: Bozikis Vaios, Moraga, CA (US)

( * ) Notice: Subject to any disclaimer, the term of this patent is extended or adjusted under 35 U.S.C. 154(b) by 5 days.

(21) Appl. No.: 16/057,475

(22) Filed: Aug. 7, 2018

(65) Prior Publication Data

US 2019/0040993 A1    Feb. 7, 2019

Related U.S. Application Data

(60) Provisional application No. 62/671,284, filed on May 14, 2018, provisional application No. 62/542,279, filed on Aug. 7, 2017.

(51) Int. Cl.
| | |
|---|---|
| *F16M 11/22* | (2006.01) |
| *F16M 11/04* | (2006.01) |
| *E04B 1/00* | (2006.01) |

(52) U.S. Cl.
CPC ............ *F16M 11/22* (2013.01); *E04B 1/00* (2013.01); *F16M 11/04* (2013.01)

(58) Field of Classification Search
CPC .......... F16M 11/22; F16M 11/04; E04B 1/00; E04G 1/20; E04G 1/28; E04G 27/00; E04G 7/00; E04G 7/02; A47B 1/056; A47B 47/00; A47B 13/06
USPC ............................................ 52/DIG. 10, 263
See application file for complete search history.

(56) References Cited

U.S. PATENT DOCUMENTS

| | | | | |
|---|---|---|---|---|
| 786,732 | A * | 4/1905 | Crandall | A47B 3/00 |
| | | | | 108/166 |
| 811,209 | A * | 1/1906 | Farrell | F16B 7/20 |
| | | | | 403/349 |
| 2,162,298 | A * | 6/1939 | Dailey | A47B 3/00 |
| | | | | 108/66 |
| 2,851,311 | A * | 9/1958 | Gibbs | E04G 1/28 |
| | | | | 182/222 |
| 2,962,034 | A * | 11/1960 | Finlayson | E04H 15/18 |
| | | | | 135/135 |
| 3,502,091 | A * | 3/1970 | Corbin | E04H 15/42 |
| | | | | 135/97 |
| 3,580,189 | A * | 5/1971 | Eisenberg | A47B 13/08 |
| | | | | 108/3 |
| 5,027,718 | A * | 7/1991 | Graham, Sr. | A47B 83/02 |
| | | | | 108/64 |

(Continued)

*Primary Examiner* — Marcus Menezes
(74) *Attorney, Agent, or Firm* — John C. Merchant

(57) ABSTRACT

A trussed suspended modular platform having uniform weigh distribution for use as a platform to construct a temporary shelter such as a tent or other structure or to hold or hang equipment and other materials off the ground. The modular geometric design includes a polygon shaped center cell, a plurality of polygon shaped body cells, and a plurality of polygon shaped edge cells forming the platform edge and corners, each corner having an anchor bar with attachment holes and hardware for attaching the platform to support posts and for attaching a center extended truss hub structure positioned over the center cell with truss cables extending from the hub to anchored platform corners. The modular design allows for use as a sturdy suspend able mobile platform with trussing system that allows for assembly and disassembly in the field without need for an even ground surface or footings.

20 Claims, 17 Drawing Sheets

(56) References Cited

U.S. PATENT DOCUMENTS

| | | | | |
|---|---|---|---|---|
| 5,203,428 A * | 4/1993 | Beeche | E04B 1/19 | 182/113 |
| 5,363,772 A * | 11/1994 | Adamidis | A47B 9/00 | 108/66 |
| 5,412,914 A * | 5/1995 | Daw | E04B 1/19 | 52/126.6 |
| 5,570,795 A * | 11/1996 | Colgrove | A47F 5/10 | 108/96 |
| 5,640,821 A * | 6/1997 | Koch | A47F 5/16 | 404/33 |
| 5,799,587 A * | 9/1998 | Branch | A47F 5/10 | 108/66 |
| 6,199,552 B1 * | 3/2001 | Crespo | A47C 15/008 | 128/845 |
| 6,648,102 B2 * | 11/2003 | Bostelman | B63C 5/02 | 182/147 |
| 7,383,597 B2 * | 6/2008 | Steiner | A45B 3/00 | 5/121 |
| 8,240,755 B2 * | 8/2012 | Valaei Khiabani | A47B 3/14 | 297/159.1 |
| 8,295,035 B2 * | 10/2012 | Collier | H02G 3/385 | 361/678 |
| 9,316,018 B2 * | 4/2016 | Bozikis | E04H 1/1205 | |
| 9,924,791 B2 * | 3/2018 | Bortolato | A47B 1/05 | |
| 2001/0011441 A1 * | 8/2001 | Jette | H02G 3/285 | 52/220.1 |
| 2002/0041794 A1 * | 4/2002 | Bostelman | B63C 5/02 | 405/4 |
| 2002/0194801 A1 * | 12/2002 | Jette | E04F 15/02458 | 52/220.5 |
| 2005/0269158 A1 * | 12/2005 | Fulton | E01D 11/02 | 182/187 |
| 2006/0283492 A1 * | 12/2006 | Livacich | E04H 15/30 | 135/120.3 |
| 2009/0312165 A1 * | 12/2009 | Rempe | A63B 22/18 | 482/146 |
| 2010/0269874 A1 * | 10/2010 | Jacoby | E04H 15/04 | 135/90 |
| 2015/0041252 A1 * | 2/2015 | Grumberg | E01D 19/106 | 182/130 |
| 2015/0250162 A1 * | 9/2015 | Wyant | E04H 15/48 | 135/147 |
| 2016/0053507 A1 * | 2/2016 | Bozikis | E04H 15/54 | 135/90 |
| 2017/0314288 A1 * | 11/2017 | Leahy | E06C 1/56 | |
| 2019/0040993 A1 * | 2/2019 | Vaios | E04H 15/04 | |

* cited by examiner

Detail D

MODULAR TRUSSED SUSPENDED PLATFORM

CROSS-REFERENCE TO RELATED DOCUMENTS

The present invention claims priority to a U.S. provisional patent application Ser. No. 62/542,279, entitled Portable Platform and Trussing for above Ground Temporary Shelter filed Aug. 7, 2017, and claims priority to a U.S. provisional patent application Ser. No. 62/671,284, entitled Trussing Apparatus for a Weight Bearing Suspended Platform filed May 14, 2018, the disclosures thereof are included herein at least be reference in their entirety.

BACKGROUND OF THE INVENTION

1. Field of the Invention

The present invention is in the field of portable construction and pertains particularly to methods and apparatus for creating a trussed and suspended modular platform having uniform weight distribution.

2. Discussion of the State of the Art

In the field of construction there are few examples of temporary shelters that are constructed with sturdy weather impervious materials. Tree house building is one example of construction that is popular and typically follows a custom plan and custom materials defined by the builder based upon the situation at hand. Construction projects where forms are used repeatedly may include tiny homes and larger manufactured homes, which are subject to construction laws in the areas they are erected.

A challenge with such projects is that they are limited to areas of broad access where vehicles and construction crews may be deployed. Therefore, a user who simply wants to erect a sturdy and weather impervious structure is fairly limited in choice such as manufactured kits that enable the user to erect a tent, a dome, a pop-up structure or the like for temporary purposes to protect items placed inside or for use to temporarily shelter one or a few people. Such structures are typically built on the ground or on a solid foundation, grounded footings or undercarriage.

A trussing system is typically a designed system that specifically addresses the load bearing issues associated with a construction project. In the art of construction, truss architecture (equipment) may be provided to secure a weight bearing surface such as a bridge surface or a raised platform. Trussing equipment typically may include, solid truss rails, steel cables, and in some cable embodiments, tensioning apparatus (i.e. turnbuckles or ratchet devices). The goal of a truss system is to strengthen a construction that has load bearing elements to uniformly distribute the load tension throughout the affected parts of the structure solidifying the construction at its weaker points.

It has occurred to the inventor that general shelter construction is lacking in truss support. This is specifically the case for load bearing platforms that may not be entirely supported by a solid foundation or undercarriage, etc. It has further occurred to the inventor that a modular platform capable of bearing a load may be raised off the ground and suspended using cables and trussed in a fashion as not to involve temporary or permanent tying-in of the platform to some other supporting structure.

Therefore, what is clearly needed is a modular suspended trussed platform that addresses the above problems in the art.

SUMMARY OF THE INVENTION

A modular geometric suspended planar platform for suspending from a plurality of support posts, the platform having a polygon shaped center cell, a plurality of polygon shaped body cells, and a plurality of polygon shaped edge cells forming the platform edge and corners. The corner cells each have anchor bars with attachment holes and hardware for attaching the platform to support posts and for attaching truss cables to the an extended truss hub positioned over and attached to the center cell. Each straight edge of the polygon shaped center cell includes attachment holes and hardware for attaching to one straight edge of an adjacently positioned body cell. The body cells have holes and hardware for attaching to any straight edge of an adjacent body cell and to a straight edge of adjacent the edge cells positioned at the edges of the platform. Each of the edge cells has attachment holes and hardware for attaching to the straight edges of the adjacently positioned edge cells and corner cells with one straight edge of each edge cell forming a perimeter of the platform and two adjacent straight edges of the corner cells forming a platform corner. Each corner cell has holes and hardware for attaching to two adjacent edge cells and one adjacent body cell. Each of the anchor bars are attached at a point on the corner cell not connected to an edge cell or body cell. Support cables are attached to the anchor bars and to a support member thereby creating the suspended geometric platform. In some embodiments, the body cells and edge cells are eliminated and a plurality of adjacently positioned corner cells surround and attach with the center cell to form the platform perimeter. In some embodiments, the anchors do not require suspension cables but instead the platform is secured to a support structure (whether poles or other supporting structures) by bolting or otherwise attaching the anchors directly to the supporting structure.

In some embodiments, a truss hub extension of polygon shape is connected to and suspended directly below the center cell. The truss hub extension includes a plurality of truss cables connected one each to the anchor bars located at the corners of the platform. The truss hub extension suspended from the center cell by attaching a plurality of support legs connected at one end to a truss hub extension collar and at the other to a straight edge of the platform center cell. In some embodiments, the truss hub extension support legs are segmented and are collapsible via pivoted joints separating each support leg. In another embodiment, the truss hub extension includes a flange protruding from the truss hub extension collar providing a cable attachment site for the truss cables. In another embodiment, the truss hub extension collar is integrated around the truss hub extension enabling connection of the support legs. In another embodiment, the platform center cell is of hexagonal shape and one end of each of the truss hub extension support legs is attached at one end, one each, at every other straight edge of the hexagonal center cell and the opposite end, one each, of the support legs is attached to the truss hub extension collar at regular intervals around the circumference of the truss hub or collar. In another embodiment, the platform center cell is of hexagonal shape and each of the truss hub extension support legs is attached, one each, at every straight edge of the hexagonal center cell and the opposite end is attached to the collar at regular intervals around the circumference of the truss hub or collar. In one embodiment, the suspended modular platform is of a uniform polygon shape. In another embodiment, the suspended modular platform is of a non-uniform polygon shape but is otherwise connected uniform in weight distribution between the support members.

BRIEF DESCRIPTION OF THE DRAWING FIGURES

DETAILED DESCRIPTION

The inventors provide a unique modular trussed platform for supporting a modular erectable shelter with persons and or equipment suspended off ground level. The present invention is described in enabling detail relative the following examples, which detail at least one embodiment of the present invention.

Figure 1:
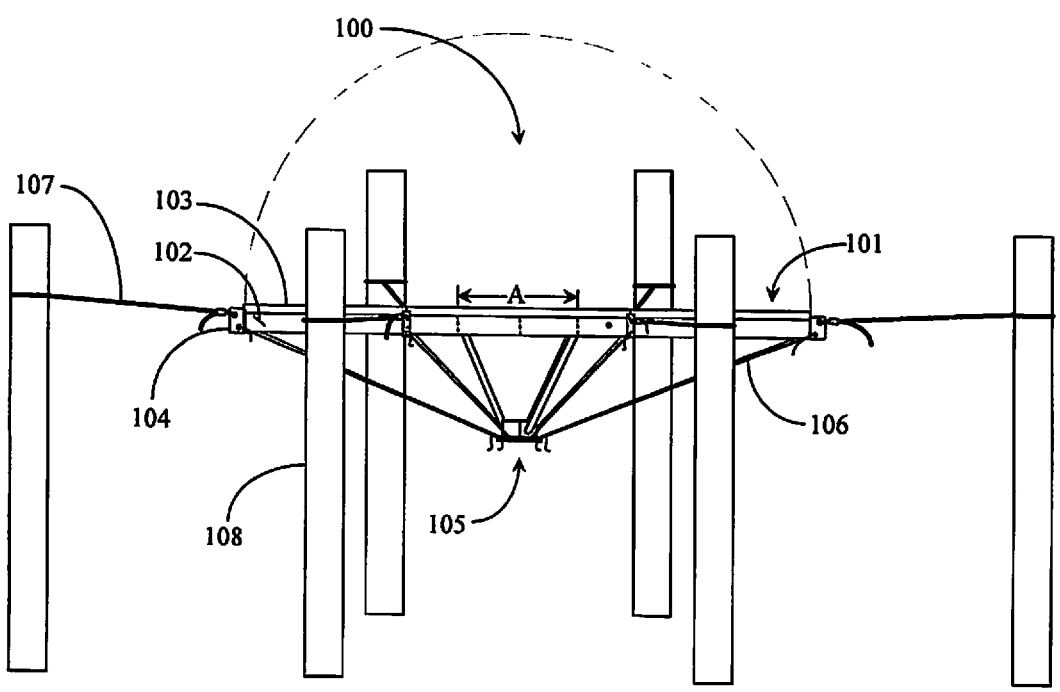
FIG. 1 is an elevation view of a camp site supporting a modular trussed platform according to an embodiment of the present invention.

FIG. 1 is an elevation view of a camp site 100 supporting a modular trussed platform 101 according to an embodiment of the present invention. Camp site 100 may be similar to a designated tent space in a camp ground with other spaces available. Camp site 100 may be a lone camp site reserved for a scientist, fire spotter, or another user or users that might utilize the modular trussed platform 101. In most circumstances the floor of the site 100 is uneven or not easily accommodating placement of flat platforms except upon footings or grounded undercarriage requiring considerable time, equipment and expense to erect and level to support and maintain the platform for purposes of accepting a structure thereon.

In the present embodiment, platform 101 comprises an assembled steel frame 102. Frame 102 may be assembled in modular fashion from individual cells bolted or otherwise fixed together to form frame 102 of platform 101. Frame 102 may have an overall symmetrical geographic profile or shape such as that of a hexagon for example. It may be assumed in this example that frame 102 has a geometric shape of a hexagon. Platform 101 includes a flooring 103 that may serve as a floor or support surface for persons or to any structure (broken radius) that may be erected over platform 101. In one embodiment, modular trussed suspended platform 101 does not include a living structure if the platform is dedicated to supporting equipment, for example, off the ground. In alternative embodiments, the frame 102 is made of materials other than steel but which have appropriate strength and durability for forming suspended platform frames as known in the industry.

Platform 101 is suspended off the ground within a geometric arrangement of posts 108. Posts 108 may be provided and erected for suspending platform 101 and posts 108 may be permanently placed so a next user may suspend a platform such as platform 101 in the same site 100. In one embodiment, a location having representative standing trees might be scouted and identified as a location where platform 101 may be suspended wherein the tree trunks may obfuscate a requirement for suspension posts 108. For example, platform 101 may also be suspended between branches in the crown of one tree without departing from the spirit and scope of the invention. In alternative embodiments, the platform 101 is suspended from grounded footings or other support means which is at or very near ground level. In alternative embodiments, the platform is partially supported on grounded footings or support members and otherwise suspended from suspension posts or other suspension connections (such as tree limbs). A purpose for a suspended platform may be to support an enclosure or structure (broken radius) on the platform and off the ground. The enclosure or structure (not elemented) may be a tent or lightweight shelter, or a more permanent shelter such as a tree house, a hunting blind, or the like.

In this view, flooring 103 is provided on top of platform frame 102. Flooring 103 may be an opaque material such as plywood, laminated, or poly flooring material. Flooring 103 may also be translucent such as a plexiglass flooring, for example. In one embodiment, flooring 103 is cut at the dimensioning of each cell and may be attached to each cell before assembling the cells into a frame like frame 102. Frame 102 may start (assembly) with a single center cell with surrounding body cells and perimeter cells such as corner cells and edge cells that may diverge from the geometric profile of the center and surrounding body cells. In this embodiment, a center cell of frame 102 is represented by dimension A, which also defines the basic foot print of truss mounting to the platform.

A truss hub extension fixture 105 is depicted in correct orientation mounted to a center cell (dimension A) of platform frame 102. Dimension A represents the footprint dimension of the center platform cell fixture 105 is mounted to. As shown, the trussing equipment is disposed beneath platform 101 although in alternative embodiments all or a portion of the trussing may extend above (instead of below) the platform depending on where the structure is to be placed. For example if the goal is to suspend equipment from the bottom of the platform, all or some portion of the trussing may be placed on the top surface of the platform. Truss extension fixture 105 includes a trust hub (or collar) for connecting truss wires and at least three truss legs with mounting brackets adapted to be bolted or otherwise fixed to the center cell.

Platform 101 includes a plurality of anchor bars 104 adapted to hold suspension cable and trussing cables referenced herein as cables 107 from trussing bar 104 to post 108, and truss wires from trust hub extension FIG. 105 to the corners of the hexagonal platform 101 therefore, there are six of these features (anchor bars 104, truss wires 106 and suspension cables 107). Anchor bars 104 are relatively thick steel bars welded, in this example, one to each corner of the hexagonal shape of platform 101. In alternative embodiments, the anchor bars may be cast, molded with, bolted to or otherwise connected in sturdy and strong fashion to the platform corners.

Anchor bars 104 provide a single-article anchor point for truss wires 106 attached at the hub of extension fixture 105. Truss wires 106 are attached through strategic openings on the hub flange provided for the purpose and to anchor bar 104 at a truss wire anchor hole. Suspension cables 107 are attached to bar 104, at a suspension cable anchor hole, to individual posts 108. In alternative embodiments, the suspension cables 107 may be attached to some other type of anchor point upon which the platform may be suspended, such as an anchor point established at a tree limb or some support member. In other words, the support members do not have to be posts but can be other points of connection on other strong supportive members which are located above ground level.

It is noted herein that truss wires 106 may be steel wires or cables of approximately one quarter inch in diameter. Suspension cables 107 may be steel cables approximately five sixteenth to three eighths of an inch in diameter. It is also noted herein that truss wires 106 may include turn buckle hardware (not illustrated) on each cable for individual cable tensioning. Such hardware is not depicted in this example but is detailed later in this specification. It is further noted herein that suspension cables 107 may include a ratcheting turnbuckle mechanism (not illustrated) for tensioning the cable to a post. Platform truss extension fixture 105 may be collapsible in a state of installation in one embodiment by providing articulating joints and segmenting the tripod legs such that they may be extended out straight and locked and unlocked and collapsed to a degree afforded by the joints. In one embodiment, fixture 105 may be modified by including a center-collar height adjustment mechanism that can be manipulated to tension all the truss wires 106 in a single operation.

In operation of the invention, the modular trussed platform system 100 of the invention uniformly distributes the load force on the surface of platform 101 into the anchor bars 104 at each corner of the platform and the connected suspension cables 107 take the load tension into posts 108 and ground. The truss wires and suspension cables work off of one another (opposing force) to equalize the load tension and provide the maximum load bearing capability to platform 101. One will note that, as shown in FIG. 1, the truss wires and suspension cable attach at the same anchor bar 104 ensuring that the tension created between the anchor points does not transfer out into other parts of the platform. In some alternative embodiments the suspension cables and truss connections are connected at the same point on the anchor bar. Varying configurations of the anchor bar are contemplated including the one presently shown which is a single bar which is welded to and extends directly outward from the outside corner of the corner cell. In other embodiments, the anchor bar may be of a "Y" shape with the arms of the "Y" connected with each adjacent outside edge of the corner cell corner.

In a preferred embodiment the platform is a construction of sturdy rigid or semi-rigs cells of a symmetrical geometric shape such as a hexagonal cell wherein each cell may be assembled to and/or attached with other cells to create a platform of the defined square footage required or desired for the base of a structure that may support a floor and may hold the weight of one or more users. In one embodiment each cell has its own floor piece cut to shape and fixed to the surface. In another embodiment a sheet of flooring material is applied over all the cells. The floor material may be plywood or any other material covering that might serve as flooring.

In one embodiment the hexagonal cells are formed of angle iron straight pieces that may be welded together to form a cell using a template or fixture for alignment and dimensional repetition. Such cells may be pre-welded and made ready for hardware assembly by providing the appropriate openings in the side walls of each cell. As depicted in FIG. 1 the hexagonal cells are assembled adjacently to one another using hardware generally available to the user such as bolts and nuts, screws, clamps or other fasteners.

The constructed platform defines a square footage in proportion with the number of cells used in construction. Each cell has a height dimension from a bottom surface (bottom edge of angle iron) to a top surface (exterior side of the angle iron). It is noted herein that other geometric shapes may be used in place of hexagonal cells without departing from the spirit and scope of the invention. Hexagonal cells represent just one of many possible geometric shapes that might be employed. Furthermore, other materials may be used in place of extruded angle iron such as rigid polymers or other rigid and durable materials that when assembled and in some cases trussed, may support the weight of one or more users or cargo the platform is intended to support.

One should note that other geometric polygonal shaped cells are depicted and are adapted to be assembled strategically about the hexagonal center and body cells to form a straight edge perimeter that retains the shape of the interior positioned (center and body) hexagonal cells. Variations on this theme may exist for creating a more oblong platform or a platform having a different overall shape than the individual cells making up the center portion of the platform.

The actual size of the platform in terms of foot print may be immediately scalable in the field by the constructing user in some embodiments such as building a smaller platform using fewer cells or adding more cells to create a larger platform according to the instant needs of the constructing user. Moreover, the size of the truss hub extension fixture may change accordingly and the length and number of trussing wires may also change accordingly including diameter of the truss wires and perhaps additional anchor points added to insure integrity of a larger platform.

It should be noted that the invention includes an embodiment wherein the platform is not held suspended by attaching to poles or other suspension members but is otherwise held suspended from the ground by a surrounding support or framing structure such as prefabricated raised deck or other raised structure having a center hole big enough to accommodate and retain the platform or by a prefabricated support structure or frame. In such embodiment the anchors 104 may not be required for suspending or tying into the support structure and, instead the platform is suspended by tying the edge of the platform into the prefabricated supporting structure or frame. In some embodiments, the anchors are utilized by bolting or otherwise attaching the anchors directly to a support structure without the use of suspension cables.

Figure 2A:
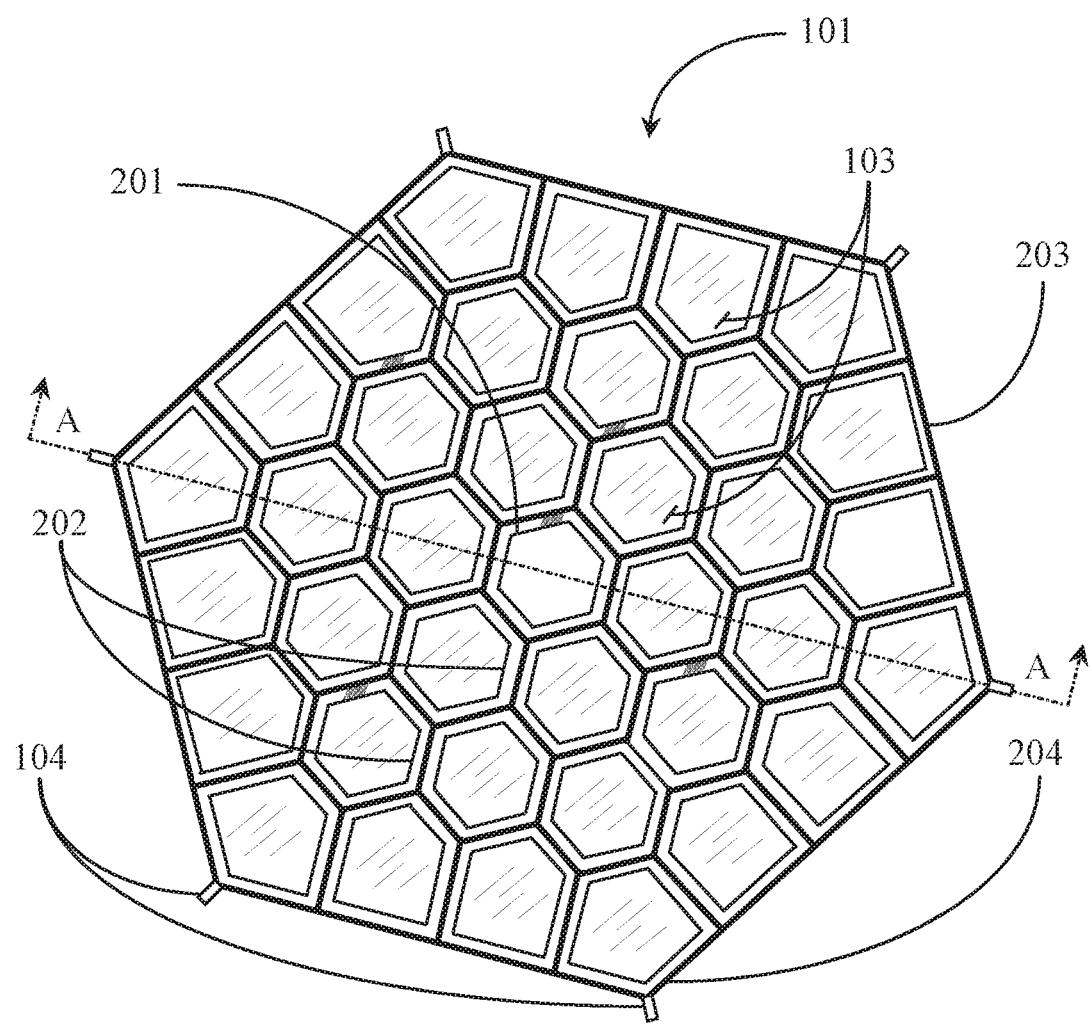
FIG. 2A is an underside view of an embodiment of the platform of FIG. 1 with center cell, body cells, edge cells and corner cells with truss architecture and hardware removed for clarity of description.

FIG. 2A is an underside view of an embodiment of a platform 101 with center cell, body cells, edge cells, and corner cells and with truss architecture and hardware removed for clarity of description. Platform 101 comprises a center cell 201 and a plurality of body cells 202 assembled to the center cell and one another and in a symmetrical fashion to form the platform frame body. Body cell 202 and center cell 201 are interchangeable parts. To finish platform 101, perimeter frame cells of differing geometric shape and dimensioning are required. Platform 100 is a steel-framed, assembled construction from individual cells (201, 202, 203, 204) placed adjacently and bolted together. In alternative embodiments, all or some of the frame components, including the individual cells making up the modular platform could be made of alternative materials that are strong and light including aluminum, carbonite, iron, or titanium. In some embodiments, having less overall weight or requiring less heavy duty connections, the cells could be made of heavy duty plastic, polycarbonate, and other materials known in the industry for purposes of creating a suspended modular platform designed to hold persons, equipment and other heavy items. Platform 100 assumes a hexagonal form in this example having six corners and associated facets. A user may assemble platform 100 beginning with center cell 201. Center cell 201 seen from the underside in this view, may preferably be fabricated from steel bracket material (corner brackets) that are welded together using a jig to form a hexagonal steel cell. The lateral presenting surface of cell 201 and the adjacent and perimeter cells support the platform flooring material 103. In alternative embodiments, the connections may be made by bolting or other heavy duty and strong connection means known in the industry.

Body cells 202 having a same design and size dimensions as center cell 102 are provided to be assembled about the center cell to form a body (assembled cells of same shape) for the platform having a symmetrical profile that may be expanded relative to the number of cells that may be made available in a modular platform construction kit for example. In some embodiments, some or all or the modular cells may be non-symmetrical but otherwise combined to form a continuous planar surface when placed adjacent to one another and bolted (or otherwise affixed) together such as with puzzle pieces tied together by appropriate attachment hardware. In the symmetrical implementation shown, additional edge cells 203, and outer corner cells 204 are provided in sufficient numbers to finish out the platform giving it a straight and vertical steel edge. The cells may be bolted together using standard hardware (i.e. bolts and nuts) through pre-drilled openings in the vertical walls of each cell. In other embodiments, cells may be fabricated in other ways and of other materials such as by clipping, spot welding, clamping, and tying using cables or other ligatures.

Platform flooring material 103 may be cut pieces of plywood (opaque) or plexiglass (translucent) that fit over and are installed to each cell. In some embodiments, the flooring material may be held between individual cell members using grooved receptacles or otherwise clamped or bolted to the underside of the cells. In one embodiment flooring 103 may be one or two pieces of material that may be installed after the cells are constructed together to form platform 101. It will be appreciated by one with skills in the art of framing that edge cells 203 are five sided cells that make up the edges of the platform while cells 204 are five sided cells shaped to fill the corners of an overall hexagonal platform. It is noted herein that other geometric forms or non-geometric forms, as suggested above with regard to the puzzle piece approach, used in a modular trussed platform frame assembly without departing from the spirit and scope of the invention including square, triangular, octagonal, trapezoidal, and so on. Geometric and non-geometric modular cells may be combined to form a contiguous plane platform surface or a non-contiguous surface (i.e. having holes) depending on what is needed by the user in terms of function. For example, a user may require a hole in the surface of the platform at a certain location to allow for equipment (air vents or plumbing) to be placed therein. In some embodiments, the cells themselves may not be flat but otherwise protrude above or below the surface for various reasons including, for example, to provide elevation for sitting persons or equipment thereon. A variety of configurations can be accomplished while maintaining the modular, strong, and suspended function of the platform apparatus.

Suspension anchor bars 104 are depicted at each corner of platform 101. In one embodiment, a selected one or ones of the platform cells may be left without a floor covering in an embodiment where the flooring is cut for each cell. In a variation of such an embodiment, the flooring could be hinged to the underlying cell structure to form a trap door that a user may lift to access the area beneath the platform. Ladders, ropes, or other implements might be provided for climbing into a shelter and existing therefrom through a platform cell with a trap door. Such an ingress/egress cell may be positioned such that moving through it does not interfere with the trussing wires or hardware underneath the platform.

Figure 2B:
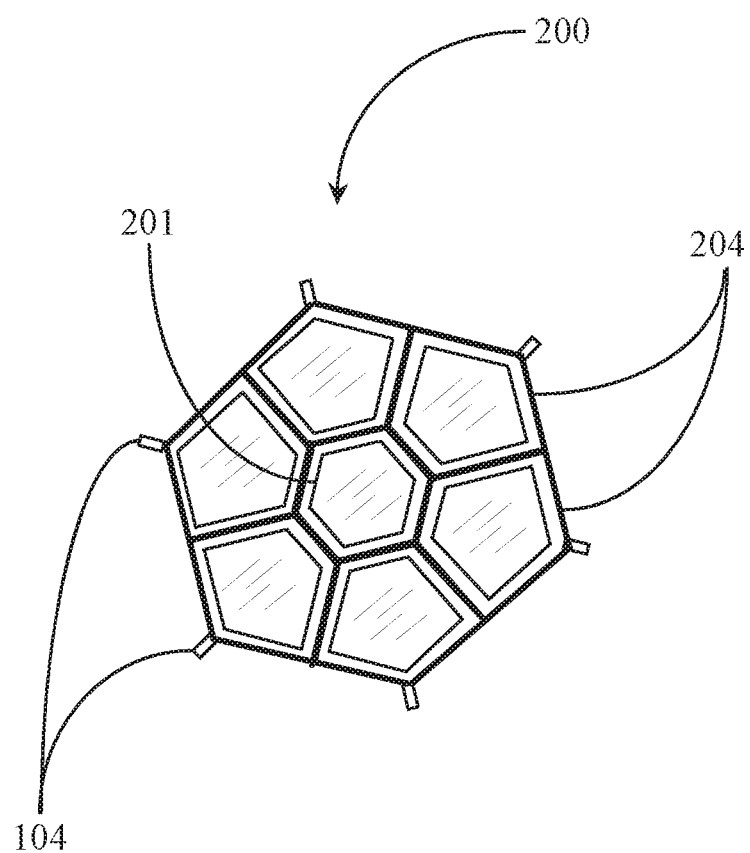
FIG. 2B is an underside view of an alternative embodiment of the platform of FIG. 1 with center cell, and corner cells with truss architecture and hardware removed for clarity of description.

FIG. 2B is an underside view of an alternative embodiment 200 of a platform 101 having only center cell and corner cells and with truss architecture and hardware removed for clarity of description. In this embodiment of the platform 101, the hexagonal center cell 201 is surrounded by and connected with six outer corner cells 204 each having anchor bars 104. This is a simpler version of the embodiment shown in FIG. 2A having the additional body cells 202 and edge cells 203 but this embodiment otherwise incorporates the same basic structural approach to that embodiment shown and described in FIG. 2A. In this embodiment, the corner cells 204 are attached with adjacently positioned corner cells, the outer edges of the corner cells defining the perimeter edge of the platform. The trussing structures described below are attachable to either embodiment as shown in FIGS. 2A and 2B.

Figure 3:
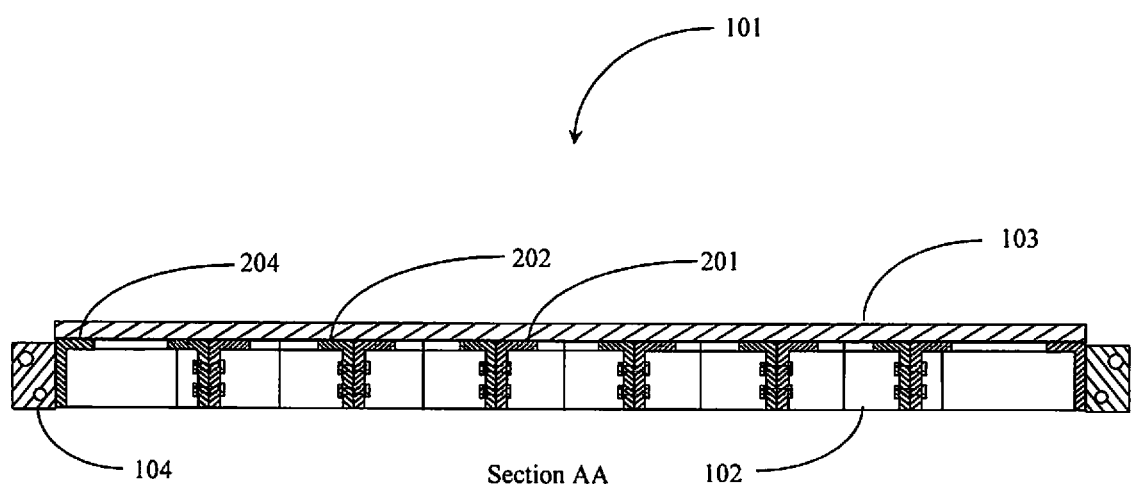
FIG. 3 is a section view of the platform of FIG. 2 taken along section lines AA.

FIG. 3 is a section view of platform 101 of FIG. 2A taken along section lines AA. In this implementation, platform 101 is depicted in half section herein from corner to corner. At center is platform frame cell 201. Cell 201 is the cell that the truss hardware is mounted to. Adjacent to cell 201 are body cells 202 and on the ends corner cells 204. Edge cells 203 are not visible in this section view.

Generally, all cells of the presented embodiment are assembled using angle iron sections angle cut to define the cells. Nut and bolt fasteners may be used to fasten the cells together although such materials are not a strict requirement of the present invention. Other fastener hardware that is available to the user and can be implemented in the field may be substituted therefor such as quick connectors that may clamp the cells together using a quarter or half turn. For assembly purposes, cells are aligned together at the adjoining sides whereas the angle iron abuts back to back forming a top support surface for flooring. Each cell may include openings strategically provided through each of the vertical walls of the cell beneath the surface of the platform wherein the user may align such cells together and connect them in the field using the bolts and nuts provided as is depicted herein. The polygonal cells about the perimeter of the hexagonal cells are assembled in the same fashion.

Truss extension hardware mounts over the center cell 201 and adjacent cells 202 and extends beneath the platform roughly at center of the platform. Suspension cable anchor bars 104 have an upper through opening for accepting the end of a suspension cable and a smaller opening for accepting the end of a truss wire. Typical cable screw-clamp hardware may be used to secure the cable and wire positions to the anchor bars 104. In one implementation, additional hardware may be provided such as threaded steel eye bolts strategically placed through the vertical wall around the perimeter of the platform wherein the eye bolts are adapted as cable stops hosting platform suspension cables (ratcheted) used to suspend the platform between trees off of the ground, or between tree limbs further up in a tree (tree house embodiment), between an array of sunken posts (just above ground) or the like.

Other modifications may be provided that are not depicted in this example without departing from the spirit and scope of the invention. Furthermore, the underside of the platform may be host to various appliances that may benefit inhabitants of a structure having this platform or one similar thereto as a floor of the structure, such as storage bins, a compost toilet, an electric appliance, etc. The underside may include attachments for ladders, hanging netting for storage or sheeting used to, for example, shield a person climbing a ladder from the elements or otherwise attaching lighting or displays.

Figure 4A:
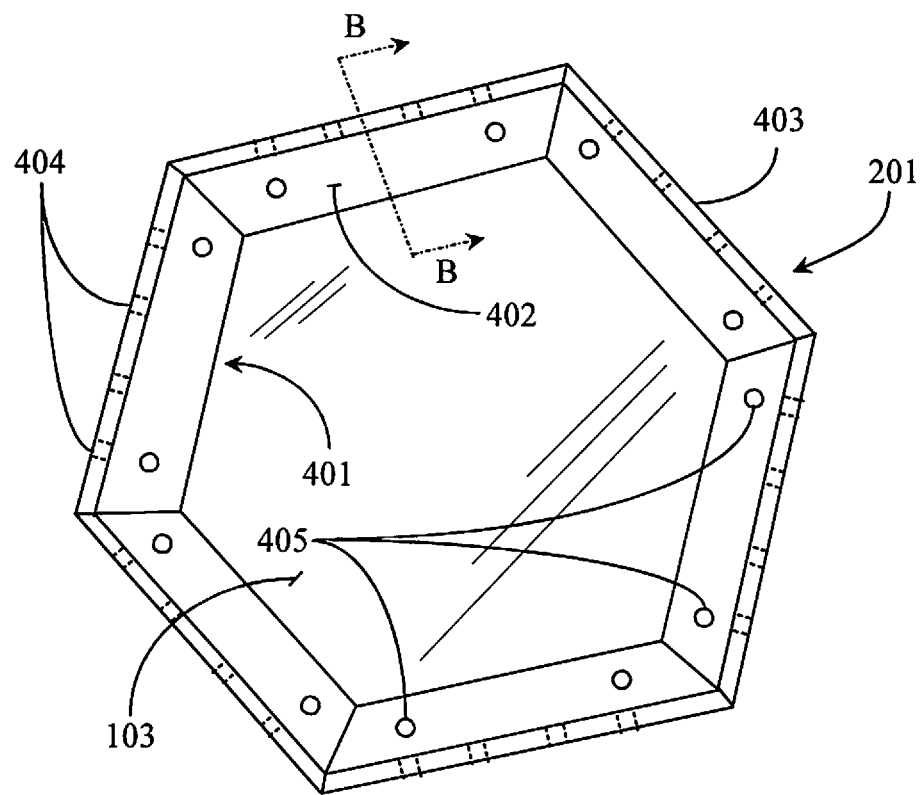
FIG. 4A is an underside view of a center frame cell.

FIG. 4A is an underside view of a center frame cell 201. Cell 201 may be fabricated by welding angle cut angle iron sections 401 together to form the hexagonal cell. Angle iron sections 401 are roughly right-angle sections or at 90-degree bend. Angle sections 401 are angle cut to fit and welded together using a positioning jig to form the cell. Each angle iron section includes a lateral wall 402 forming a support surface for flooring 103 of platform (101), and vertical wall 403 forming the vertical interface for adjacent cells to be mounted to through lateral through openings 404.

In this example there are four through openings 404 placed through each vertical wall 403 of an angle iron section 401. A staggered hole pattern may be observed for alignment purposes and to distribute locking force evenly. Each angle iron section 401 includes at least two openings 405 placed through surface wall 402. Openings 405 may be threaded openings that may accept a threaded machine screw used to screw down flooring material 103. In one embodiment flooring material 103 may be cut to fit each cell and may be adhered to each cell using a glue without departing from the spirit and scope of the invention. In another embodiment the flooring material may be mounted to the underside of the cell using attachments through the angle irons or otherwise positioning the flooring between grooves established within the angle irons for holding flooring securely in place at perimeter. In some embodiments, the cells frames may have members which cross from one side to the other to create additional bracing and support to the flooring mounted thereon. In some embodiments, particularly those providing for flooring materials that are softer and more pliable than wood, the cells may utilize netting or screening mounted between the cell frames to support the materials placed thereon without necessarily requiring the flooring material to be solidly mounted on top of the cells. For example, the cells may have screening between perimeter frame allowing camping mats or other softer materials to serve as the flooring of the platform. In such cases the screening may be considered the flooring or it may be considered support for flooring materials.

Figure 4B:
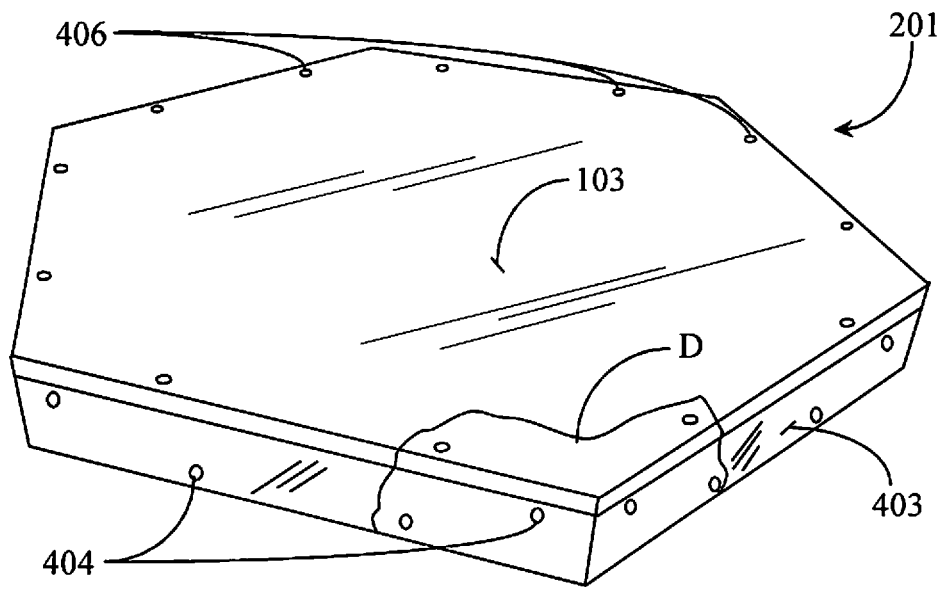
FIG. 4B is a perspective view of the cell of FIG. 4A.

FIG. 4B is a perspective view of cell 201 of FIG. 4A. In this view, openings 404 exhibit a stagger pattern with two openings proximal to the upper corners and two openings proximal to the lower central edge. Openings 404 on vertical walls 403 align with the same pattern of openings on another angle iron section providing through space for mounting hardware. Flooring material 103 includes a pattern of counter bore through openings 406 that may accept a machine screw for threading into threaded openings 405 of FIG. 4A.

Figure 4C:
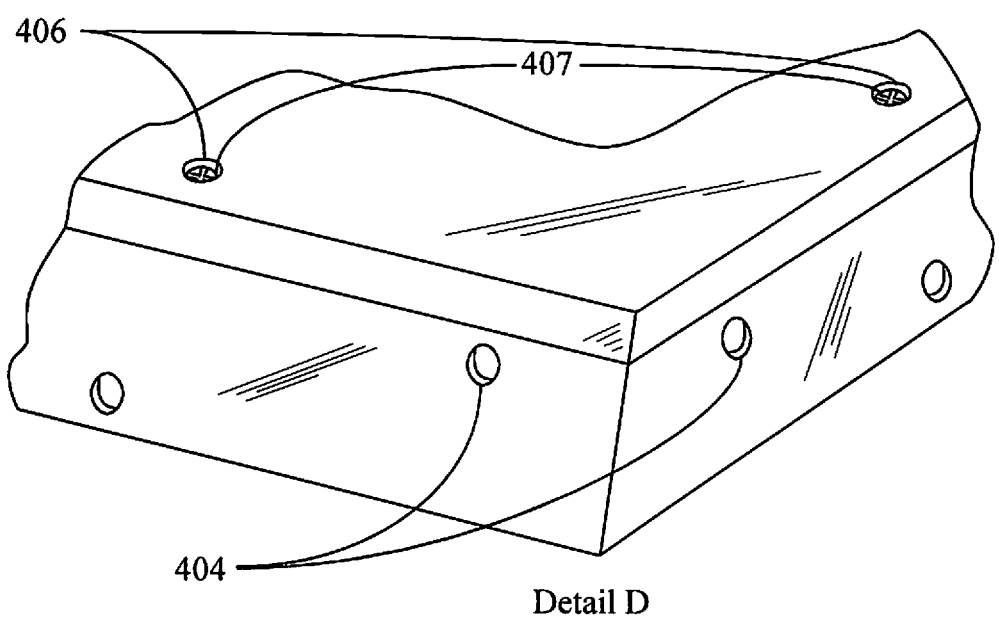
FIG. 4C is a partial exploded view of the platform cell of FIG. 4B according to detail D of FIG. 4B.

FIG. 4C is a partial exploded view of platform cell 201 of FIG. 4B according to detail D of FIG. 4B. In this exploded view, machine screws 407 are visible in counter bores 406. Machine screws may be used to fix floor section 103 to cell 201. In one embodiment the flooring material is a resilient rubber, vinyl, composite or other material designed to maintain strength and resiliency while also providing some cushion, lightness, breathability or other function preferable for the particular function of the platform surface in the field (such as flexibility, pack-ability, opaqueness or other feature). In some circumstances, for example, the modular platform might be utilized in a backpacking situation where lightness (pack-ability) is required in which case the flooring material could be made of a lighter material. In other circumstances, it may be desired that light be shone through the flooring to illuminate something positioned above the platform surface in which case the flooring could be made of an clear or slightly opaque plexi-glass material.

Figure 5A:
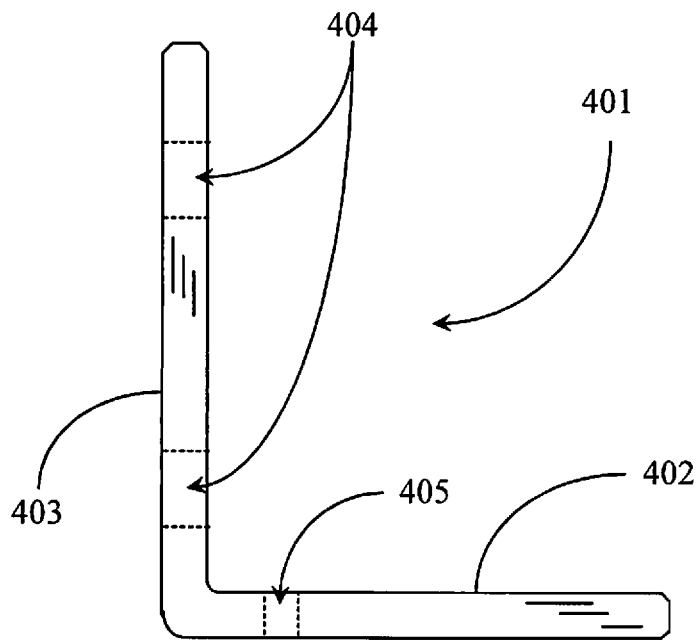
FIG. 5A is an end view of the iron angle cell section of FIG. 4A.

FIG. 5A is an end view of an angle iron cell section 401 of FIG. 4A. Angle iron section 401 may be one eight to a quarter of an inch thick (wall thickness). The height and width of angle iron used to construct a cell may vary, however a height and width of approximately one and one-half inches or two inches square may be sufficient. In one embodiment vertical wall 403 has a height dimension longer than the length dimension of wall 402.

Figure 5B:
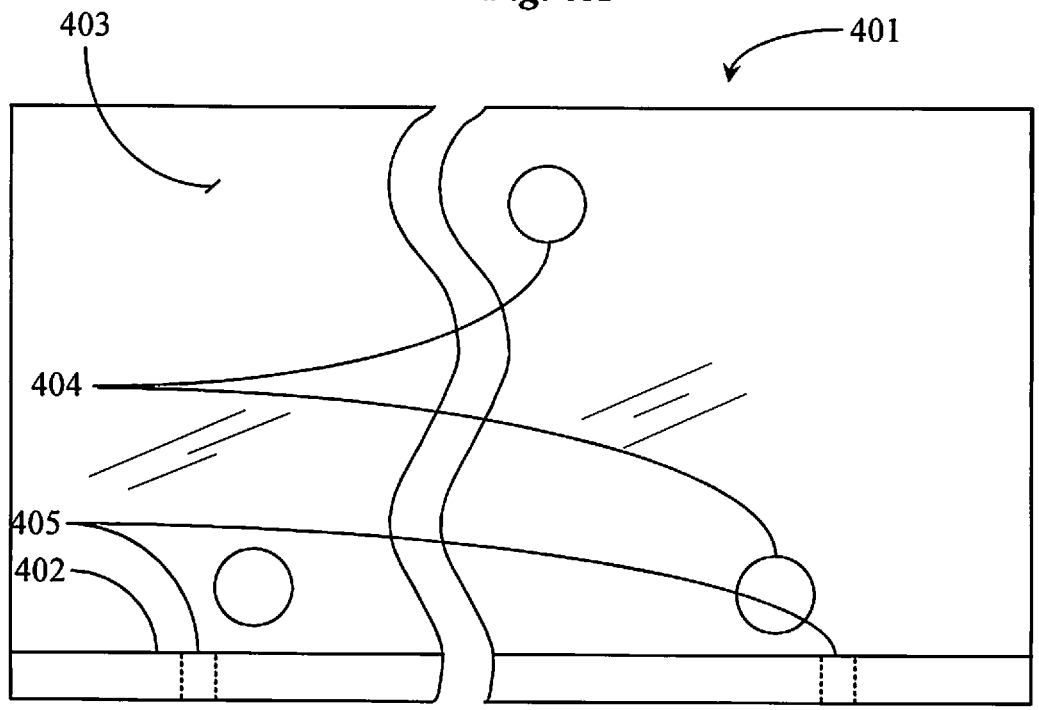
FIG. 5B is an elevation view of the iron angle section of FIG. 4A.

FIG. 5B is an elevation view of iron angle section 401 of FIG. 4A. In this view through openings 404 are depicted through wall 403 and threaded through openings 405 are depicted through lateral wall 402. The length of angle iron section 401 is depicted in broken view to save illustration space. Furthermore, the ends of angle iron section are angle cut for weld to form a hexagonal cell profile.

Figure 6A:
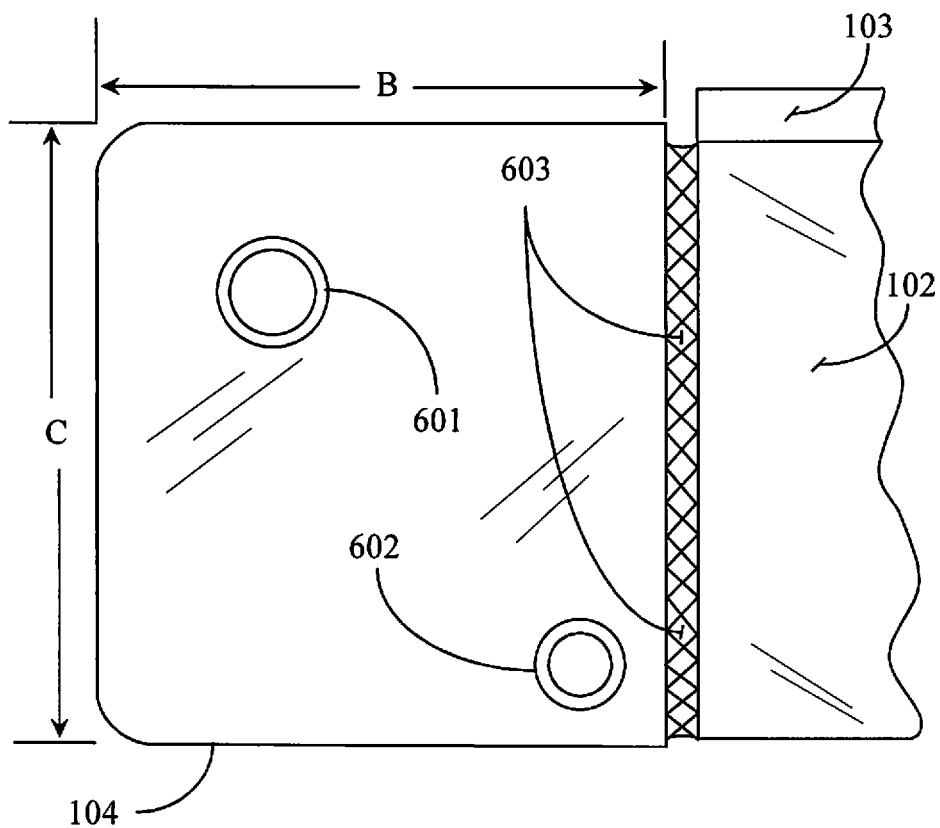
FIG. 6A is a side elevation view of the cable suspension bar of FIG. 1 including a corner portion of platform 101 to which it is welded.

FIG. 6A is a side elevation view of cable suspension bar 104 of FIG. 1 including a corner portion of platform 101 to which it is welded. Cable Suspension anchor bar 104 may be fabricated of steel. In one embodiment, anchor bar 104 is welded to the outward facing corner of each platform corner of platform 101 with respect to FIG. 1. In this example, the corners of anchor bar 104 are radiused on one side to remove sharp corners and left sharper on the side that is welded to the vertical corner of the platform. Anchor bar 104 includes a truss wire anchor opening 602 (through hole) at lower right from the perspective of the viewer. Opening 602 is chamfered on both sides to remove sharp edges. Anchor bar 104 includes a suspension cable anchor opening 601 (through hole) at upper left from the perspective of the viewer. Opening 601 is also chamfered at both ends to remove sharp edges.

In this example, the diameter of suspension cable anchor hole 601 is somewhat larger than that of truss wire anchor hole 602 to accommodate a greater diameter of the suspension cables over the trussing wires. In approximation, a dimension A may be a few to four inches in height and dimension B may be comparable for length. Anchor bar 104 is welded to platform frame 102 at the corner as indicated by weld material 603. Anchor bar 104 is typically welded to the corner cell 204 of FIG. 2 using a position jig to ensure the proper position of the bar relative to the corner.

Figure 6B:
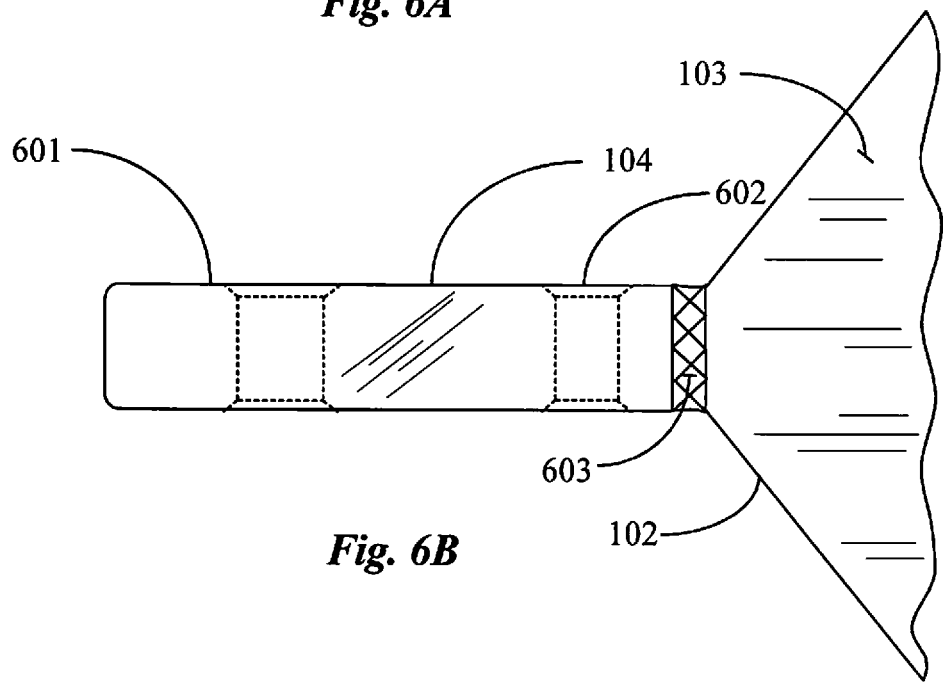
FIG. 6B is an overhead view of the anchor bar and platform corner of FIG. 6A.

FIG. 6B is an overhead view of anchor bar 104 and platform corner of FIG. 6A. Anchor bar 104 may be approximately one-half inch thick solid steel. The diameter of suspension cable anchor hole 601 may be approximately one-half inch to three quarter of an inch in diameter (0.500-0.750") while trussing wire anchor hole 602 may be approximately three eighths of an inch in diameter (0.375"). The exact diameters of cables, wires, and anchor holes may vary according to design and intended utility including the planned weight bearing capacity (load measured in pounds) expected of the platform and the weight of the platform as well.

Figure 6C:
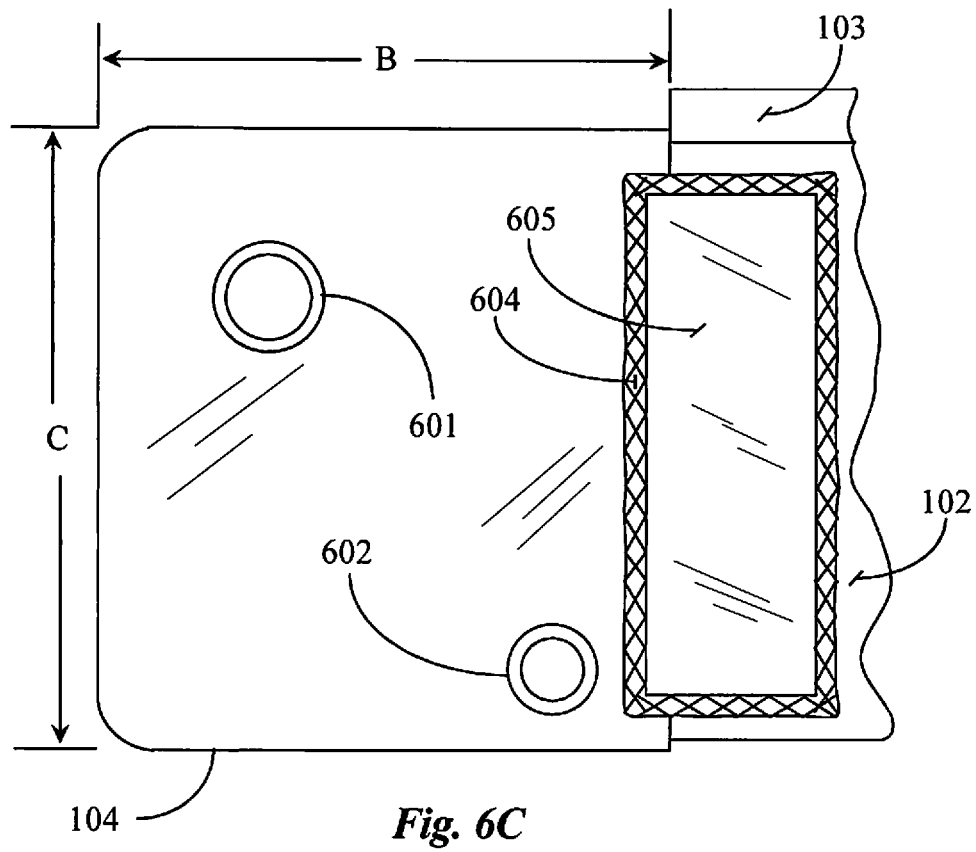
FIG. 6C is a side elevation view of the cable suspension anchor bar of FIG. 1 including a corner portion of the platform to which it is welded according to another embodiment of the invention.

FIG. 6C is a side elevation view of cable suspension bar 104 of FIG. 1 including a corner portion of platform 101 to which it is welded according to another embodiment of the invention. In this example, anchor bar 104 includes two angled weld plates 605 welded to the bar at weld line 604 on both sides of the bar. Weld plates 605 may be welded to the vertical edges of bar 104 to the outside and angle out from the bar surfaces at an angle compatible with the corner of the platform. The corner cells are pentagons and the corner angle is approximately 108 degrees. In the embodiment shown, plates 605 are further welded to the surface of frame 102 (corner cells) around the remaining edges of the weld plates to insure strength of the weld. In an alternative embodiment, no separate plate 605 is required and bar 104 is welded directly to the corner cells 102. In one embodiment anchor bar 104 with weld plates 605 attached is placed against a corner cell corner (abutted against) and orientation is provided by the weld plates roughly matching the corner angle of the corner cell.

Figure 6D:
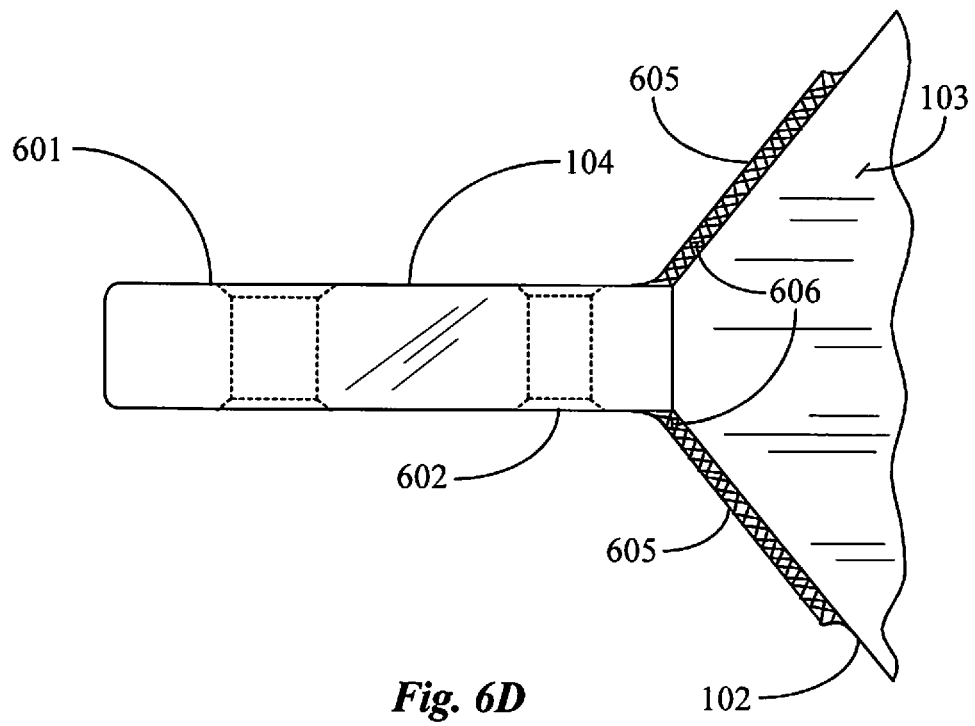
FIG. 6D is an overhead view of the anchor bar of FIG. 6C and the weld plates 605 of FIG. 6C welded onto a platform corner according to an embodiment of the invention.

FIG. 6D is an overhead view of anchor bar 104 and weld plates 605 of FIG. 6C welded onto a platform corner 102 according to an embodiment of the invention. In this view, anchor bar 104 may be positioned against the platform corner 102 with weld plates 605 functioning as weld position guides. Welded bead 606 represents the weld around each of the weld plates to the platform corner cell surface. The exact method of weld attachment may depend in part on expected size and weight load support capacity expected of the platform. For example, a thicker weld like that of FIGS. 6A and 6B is stronger than the thinner welds depicted in FIGS. 6C and 6D. Moreover, weld plates 605 may provide better resistance to lateral shear forces on the welded anchor bar. Anchor bar 104 may also be welded to the corner cell (204) before the platform is assembled and the flooring 103 is installed.

One with skill in the art of welding load bearing or stress reduction components in an architecture will appreciate that fixed weld may in some embodiments produce a stronger attachment than other methods such as bolting. However, anchor bars 104 may be bolted to the platform corner cells using a nesting fixture without departing from the spirit and scope of the invention. The inventor prefers a solid weld to maximize load bearing properties. It will also be appreciated that the anchor bars equally share the load during suspension of the platform. In alternative embodiments of the invention, substitutes may be made for welded connections. For example, in some embodiments the anchor bars and outside corner edges may be cast as a single piece. In some embodiments, injection molding can utilized as a substitute for welding when using moldable materials such as polycarbonate or heavy duty plastic.

Suspension cables and truss wires may be inserted through respective anchor openings and cable/wire screw clamps that are known in the art may be used to secure the attachments. A typical cable clamp works by trapping the cable end and cable body together after it is threaded through the anchor opening and clamping down on the installation using screws and the architecture of the clamp. The inventor is aware of and has access to cable and wire clamps, turnbuckles and ratchet mechanisms that may be used to take up cable and wire slack and to tension said cables and wires.

Figure 7:
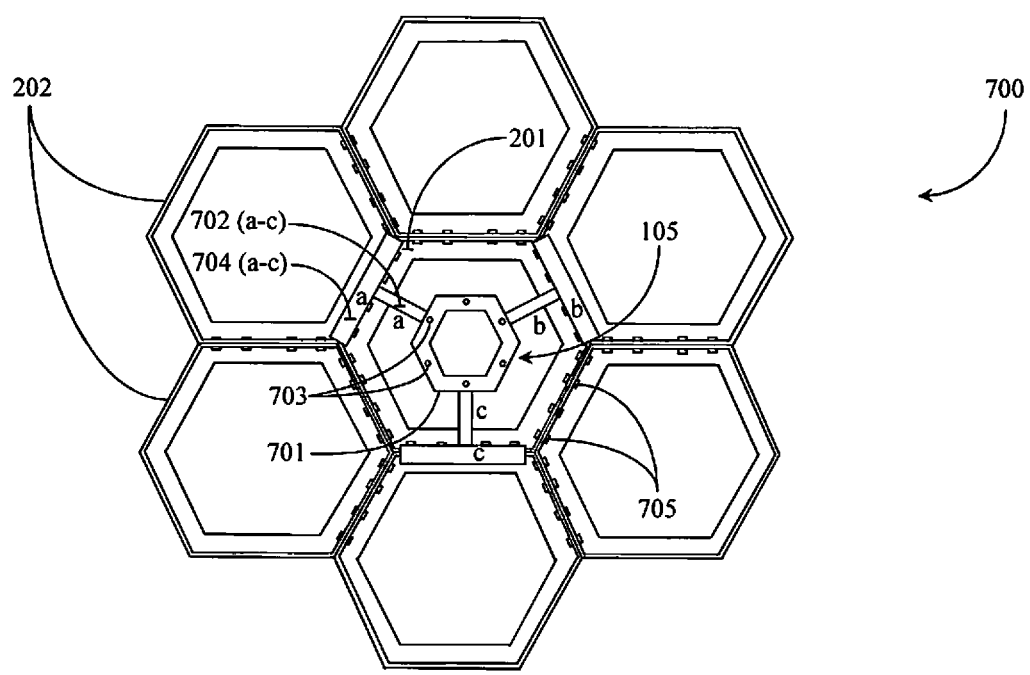
FIG. 7 is an underside view of a platform frame body minus edge cells and corner cells.

FIG. 7 is an underside view of a platform frame body 700 minus edge cells and corner cells. Platform frame body 700 includes center frame cell 201 and at least one layer of surrounding body cells 202. Body cells 202 are interchangeable parts and any cell may be selected and used as a starting center cell when assembling a platform such as platform 101.

Hardware 705 is provided to fix the cells together along the interfacing cell edges. Hardware 705 may consist of a threaded bolt that accepts a threaded nut and perhaps a compression washer or snap washer to prevent passive reverse threading of the installation. In one embodiment, hardware 705 may consist of a blind female threaded seat with a head larger in diameter that the host opening and a male threaded bolt with a similar head that may be threaded into the seat component. The components may be held to length such that there is proper thread length to tighten the two surfaces together, in this case, at four locations per cell side. Attachment component heads may be Allan heads, Hex heads, or Screw heads without departing from the spirit and scope of the invention.

In this embodiment, truss extension fixture 105 is installed to cell 201. In this example, the pattern of through openings on each angle iron bracket 704 (*a-c*) is sufficiently identical to the pattern on the cell wall and the hardware extends through the vertical wall on each bracket 704 (*a-c*) and the center cell and body cell walls abutted together. In one embodiment the hardware for hatching the truss fixture 105 is longer than the hardware for attaching two cells together to accommodate the extra thickness of the interface brought by the vertical wall of the trussing fixture bracket.

Truss hub 701 extends down from the platform at center in correct orientation of the modular platform 101. Truss fixture extension legs 702 (*a-c*) are angle cut at both ends and are welded to fixture mounting brackets (angle iron) at the cell end and to the collar of truss hub 701. In this view, the hardware fixing the truss hub fixture 105 to the center cell 201 is visible on the inside of the cell but hidden on the other side by the lateral walls of the angle iron brackets. These lateral surface flanges of the truss hub fixture 105 may be utilized as mounting flanges for other components such as a lighting source, food storage containers, composting toilet, small generator, or other like components.

Figure 8:
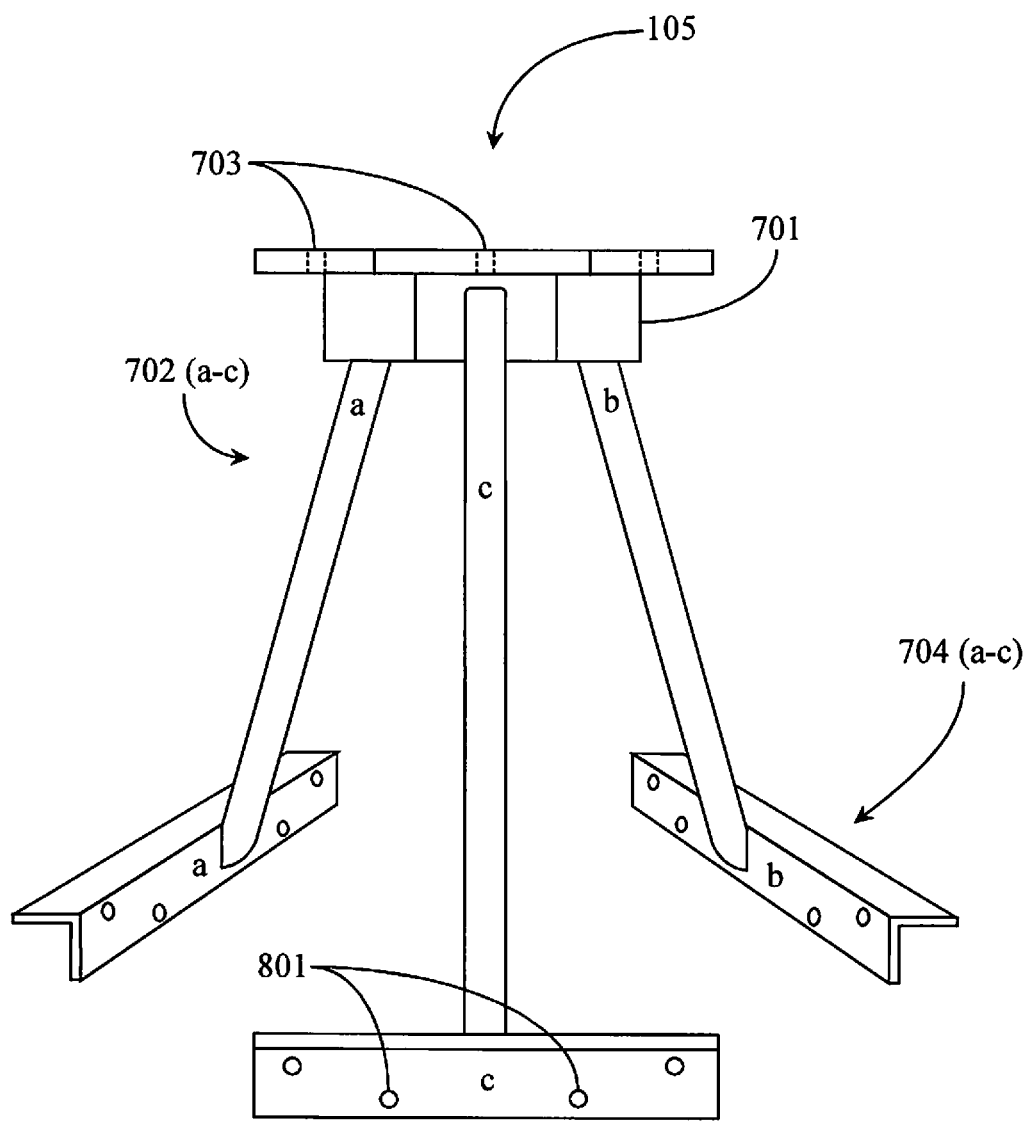
FIG. 8 is an elevation view of the truss hub extension fixture of FIG. 1.

FIG. 8 is an elevation view of truss hub extension fixture 105. Truss hub extension fixture 105 includes a central truss hub 701. Truss hub extension fixture 105 is provided as a mounted centerpiece to which trussing wires may be attached that lead out and down to a same number of platform suspension anchor bars where the truss wires are anchored. Truss hub extension fixture 105 comprises a hexagonal hub fashioned from the same materials as the platform cells 102, 103, and 104. Fixture 105 includes three or more extension legs provided of a uniform length that extends the central hub a distance to obtain a suitable truss angle from horizontal. Truss hub 701 may be fabricated from steel angle iron sections or corner brackets in similar fashion as cell angle iron sections previously described above. These sections are angle cut at the ends and jigged with fixturing and welded together as was described above regarding the platform center cell 201 and body frame cells 202. Truss cable anchor holes or openings 703 are provided through the horizontally presenting flange of the hub 701 one per section or six openings each opening strategically located approximately mid-way between each corner. Truss wires may have hardware that enables snapping the wires to the openings in one embodiment.

Fixture 105 includes tripod leg base 702 (*a-c*) to present truss hub 701 at an appropriate trussing angle below the modular platform (in correct orientation). Legs 702 (*a-c*) may be fabricated of annular or rectangular steel rods or tubing. Each leg is attached to truss hub 701 on the outside vertical wall surface of the collar portion formed by the fabrication of the hub. In one embodiment, there may be more than three legs 702 (*a-c*), up to six legs maximum or one leg for each facet of a hexagon center cell like cell 201 of FIG. 1.

In one embodiment, extension mounting brackets 704 (*a-c*) are three sixteenth inch thick steel corner brackets or angle irons having two walls presenting orthogonally like the sections used to fabricate each frame cell. The length of the extension mounting bracket may be dictated by the length of the cell facet of the cell mounted to. In one implementation, truss extension fixture 105 is jigged (part welding fixture) and welded together. The welding points are at the top of each extension leg to the hub collar walls and at the location of mounting brackets 704 (*a-c*). In another implementation, the legs may be bolted to hub 701 at the collar and the mounting brackets may be bolted to the legs 702 (*a-c*) at the other end. In such an implementation, the ends of the legs may be angle cut to enable flush bolting to the vertical surfaces of the collar and of the mounting brackets (angle irons) provided for mounting to the center cell 201. In one embodiment, each extension leg can be unbolted or otherwise disassembled using tools so that the entire fixture can be made more compact for shipping and then reassembled.

It is noted herein that the mounting orientation for truss hub extension fixture 105, more particularly the orientation of the truss hub 701 is identical to the center cell orientation of the cell it is mounted under. Angle irons 702 (*a-c*) each include a pattern of through mounting holes or openings 801 for aligning to the same pattern of openings 404 placed through the vertical cell walls, for example the walls of the center cell 201 and adjacent body cell 202. In an embodiment wherein, the legs 702 (*a-c*) are bolted to hub 701 and to mounting brackets 704 (*a-c*), the fixture 105 may be disassembled and may be stowed within the confines or inner space of center mounting cell 201. The distance from hub 701 and the center cell 201 it is mounted to depends upon the desired truss angle and the "cell size" of the platform. A truss angle is the angle from horizontal (platform plane) a truss wire exhibits when installed and tensioned between the collar of the truss hub and anchor bar.

One should appreciate, as previously stated, that the the size and height of the truss fixture as well as the location and number of truss cables is dependent on the overall structural needs of the platform with respect to the number of cells used to make the platform and overall size and weight. For example, the present invention may be made with a greater number of center and side cells and thus be much wider and heavier than the embodiment shown in the drawings. Such embodiment could require a longer hub extension, wider hub or other modifications of the truss cable length or attachment which is understood in the industry and within the scope and spirit of the invention. In other words, the invention is not limited to the specific number and size of the various components described herein but such numbers are relative and proportional to one another in terms of providing adequate strength and support to the platform.

It should be noted that male and female connectors might be used in place of bolts and nuts to assemble a platform of cells and to connect a truss hub extension fixture 105 to the center cell 201 without departing from the spirit and scope of the invention. In one alternative, the male and female connection hardware might be threaded as is known in the art. In an alternative embodiment, the male and female connectors might include female bolt receptor holes formed within the insert ring that accept a cylindrical nonthreaded male bolt having a bent or otherwise non cylindrical end portion which, when turned within the female receptacle, will lock into place within a correspondingly formed end female receptacle portion using a minimum of effort and turning. In a further alternative embodiment, the end portion of the female receptacle could have an angled seating area that allows the male bolt to be inserted and locked into place without turning and then released upon turning. Such alternative mechanisms would rely on a separate locking mechanism preventing the male bolt from turning once positioned within the female receptacle and locked into place.

It should be noted that in alternative embodiments of the invention, six legs (instead of the three depicted in the various illustrations) might be utilized in an equally spaced fashion around the hexagonal ring 701 in order to increase the overall strength of the truss hub extension fixture 105 and overall apparatus. In such instance, issues associated with portability caused by the additional weight associated with the use of six, rather than three, legs might make it more advantageous to allow for easy disassembly of the legs from the collar and apparatus to allow the legs to be carried in separately rather than as an attached apparatus.

Figure 9:
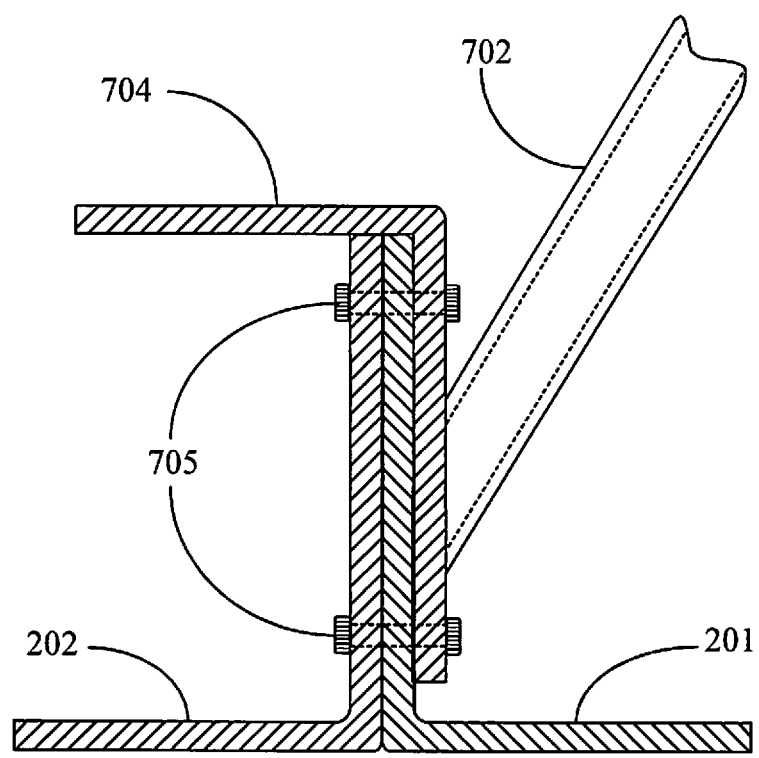
FIG. 9 is a sectioned view of an installation interface of extension mounting bracket mounted over adjacent vertical walls of center cell 201 and body cell 202.

FIG. 9 is a sectioned view of an installation interface of extension mounting foot 704 over adjacent vertical walls of center cell 201 and body cell 202. It is noted herein that this section view is inverted from the orientation of a suspended platform. The platform and trussing hardware is assembled in inverted orientation then once assembled the platform may be flipped over and suspended by cable.

Mounting bracket 704 (*a-c*) is placed adjacent to the inside wall of a cell facet of center cell 201. An adjacent body cell 202 (facet) is placed adjacent to the outside wall of the cell facet of cell 201. The pattern of openings may be aligned and the fastening hardware 705 may be installed and tightened to fix the components together. Hardware 705 may comprise a male threaded bolt and a female threaded nut. In one implementation a female threaded seat and a male threaded bolt are provided. Other fastening methods and hardware may be utilized without departing from the spirit and scope of the invention.

The major horizontal surface formed by cell 201 and adjacent cell 202 provides platform support for the flooring. The minor horizontal surface may be used to mount accessories beneath the platform as was described further above in this specification. For example, a lighting source could be provided and mounted directly beneath the platform wherein the flooring is translucent like plexiglass allowing light up into the shelter erected atop the platform. In this example, the hardware may be tightened by clockwise and counter clockwise turning of each hardware component to thread them together. The heads may be adapted for Allan wrench, Socket wrench, etc.

Figure 10:
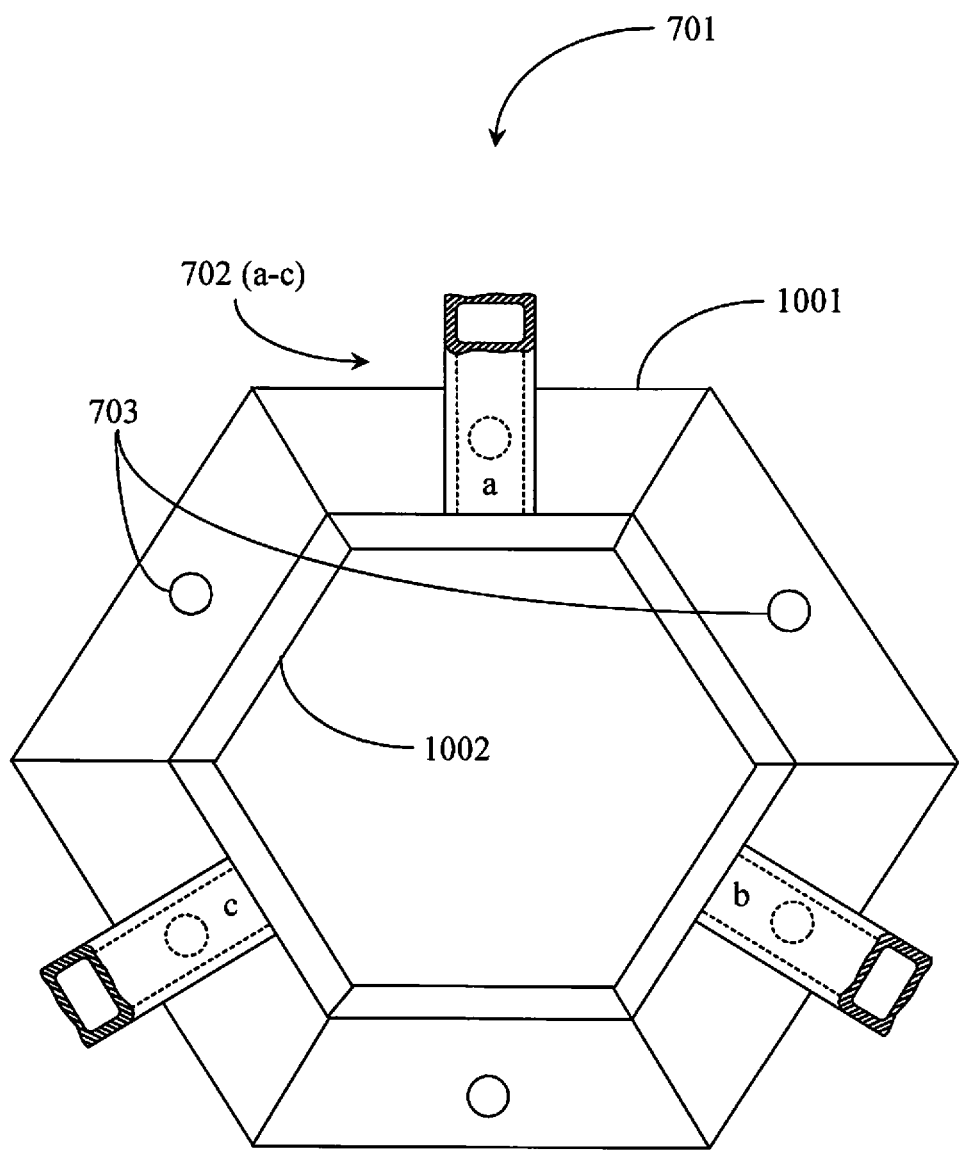
FIG. 10 is an underside cut view of the truss hub 701 of FIG. 7.

FIG. 10 is an underside cut view of truss hub 701. Truss hub 701 includes a flange 1001 and a collar 1002. Flanges 1001 include openings 703 through which truss wires may be attached leading out to the respective cable suspension bars. Tripod legs 702 (a-c) are rectangular as depicted in this cut view. Tripod legs 702 (a-c) are angle cut and welded to collar 1002 at a designated mounting angle. Mounting brackets are sectioned off in this view and are not visible. A preferred truss angle may be observed that may dictate the length of and the angle of presentation of legs 702 (a-c). There may be a total of six legs in a truss hub extension fixture without departing from the spirit and scope of the invention.

Figure 11A:
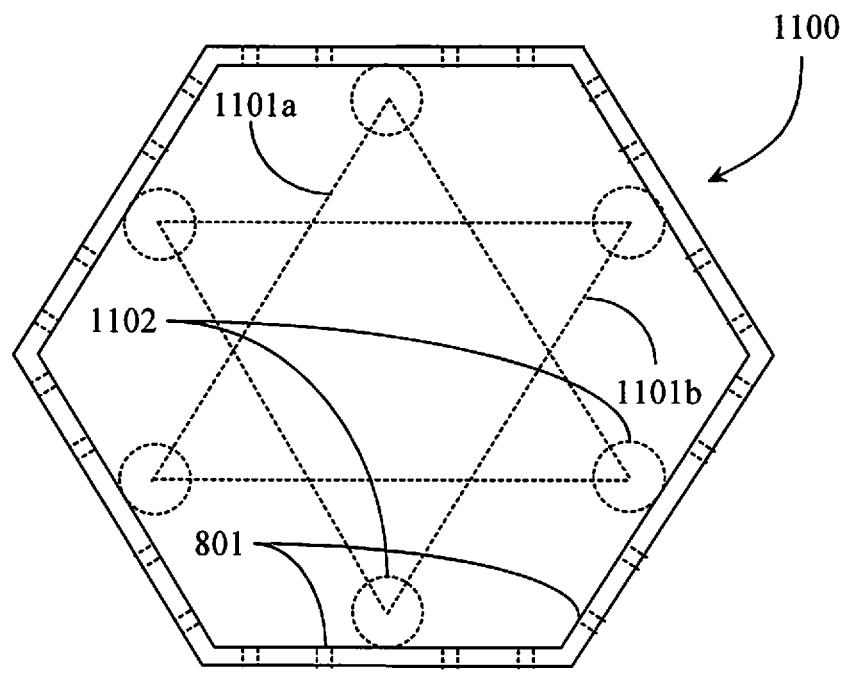
FIG. 11A is a block diagram depicting possible truss mounting positions relative to a mounting ring.

FIG. 11A is a block diagram depicting possible truss mounting positions relative to a mounting ring 1100. Mounting ring 1100 may be provided as a base for a truss hub extension fixture in place of mounting brackets 704 (a-c). Mounting ring 1100 may include the identical hole pattern as angle iron mounting brackets. The outside dimensions of ring 1100 are held slightly smaller than the inside dimensions of a center cell. Pattern 1101a represents one possible orientation for a truss hub extension fixture with three legs like fixture 105. Pattern 1101b represents the other possible orientation for the fixture with three legs. Broken circles 1102 represent the tripod legs 702 (a-c) of the fixture. In one embodiment there may be six legs all angle cut and welded or bolted to the inside wall of ring 1100. Ring 1100 with extension fixture attached may be inserted into a center cell such as cell 201 of FIG. 2 above. Openings 801 represent the hole patterns for mounting cell to cell and fixture to cell.

Figure 11B:
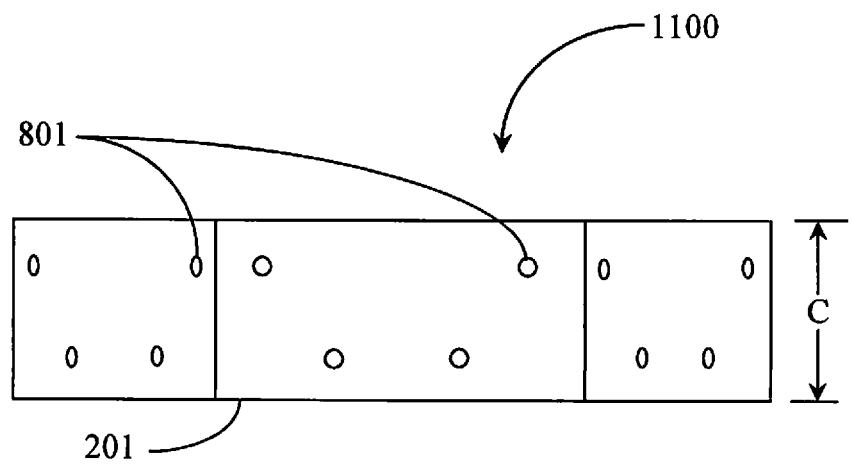
FIG. 11B is a block diagram depicting a possible hole pattern for the mounting ring of FIG. 11A for cell mounting.

FIG. 11B is a block diagram depicting a possible hole pattern for mounting ring 1100 for cell mounting. Openings 801 may be provided in other patterns without departing from the spirit and scope of the invention. Dimension C may be an inch and one half of an inch to two inches high. In one embodiment, a truss hub extension fixture utilizes ring 1100 in place of separate mounting brackets. The mounting ring is the same shape but slightly smaller that the center mounting cell. Ring 1100 may slip fit into a center cell. Fastening hardware may be inserted through the ring and adjacent center and body cell walls to fasten them together in alignment. In this example six extension legs may be provided instead of three extension legs per fixture. A three-leg fixture may also utilize mounting ring 1100 in place of separate mounting brackets.

Figure 12:
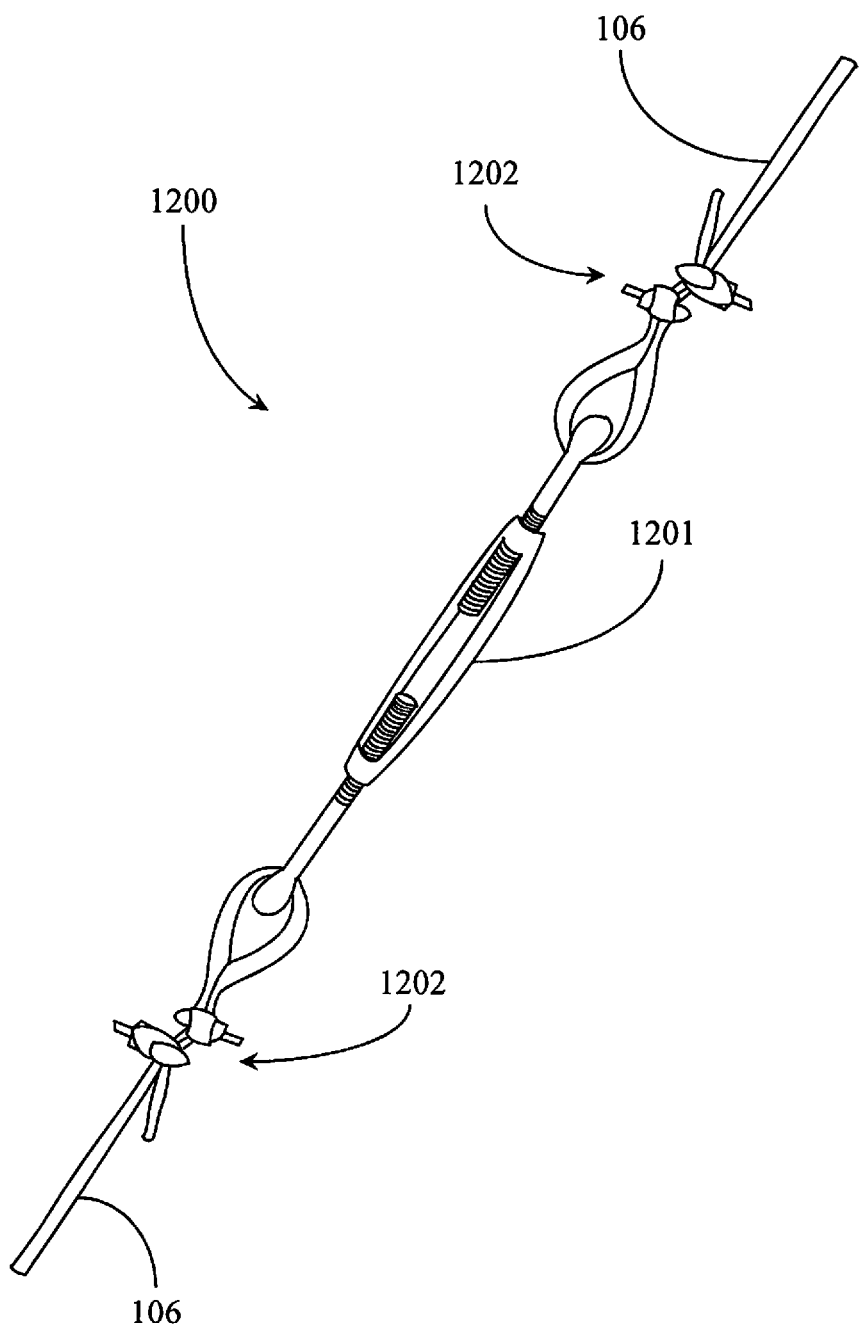
FIG. 12 is an exemplary perspective view of a turn buckle hardware that may be used to individually apply tension to truss wires like the truss wires of FIG. 1.

FIG. 12 is an exemplary perspective view of a turn buckle hardware 1200 that may be used to individually apply tension to truss wires like wires 106 of FIG. 1. Turnbuckle 1201 may be used to secure cable loop attachment screws to the turn buckles with the wires secured to their respective anchor points, more particularly the truss hub and anchor bars. Securing hardware 1202 may be used to secure wires 106 threaded through the cable loop attachment screws of the turnbuckle 1201. Suspension cables leading from the platform anchor bars to posts or tree trunks may include ratcheting hardware to take up the slack in and tighten suspension cables to desired tensions for suspending the platform in a substantially horizontal plane. In one embodiment of the present invention, the truss hub extension fixture 105 includes extension legs that are jointed to enable break down from a locked extended position.

Figure 13A:
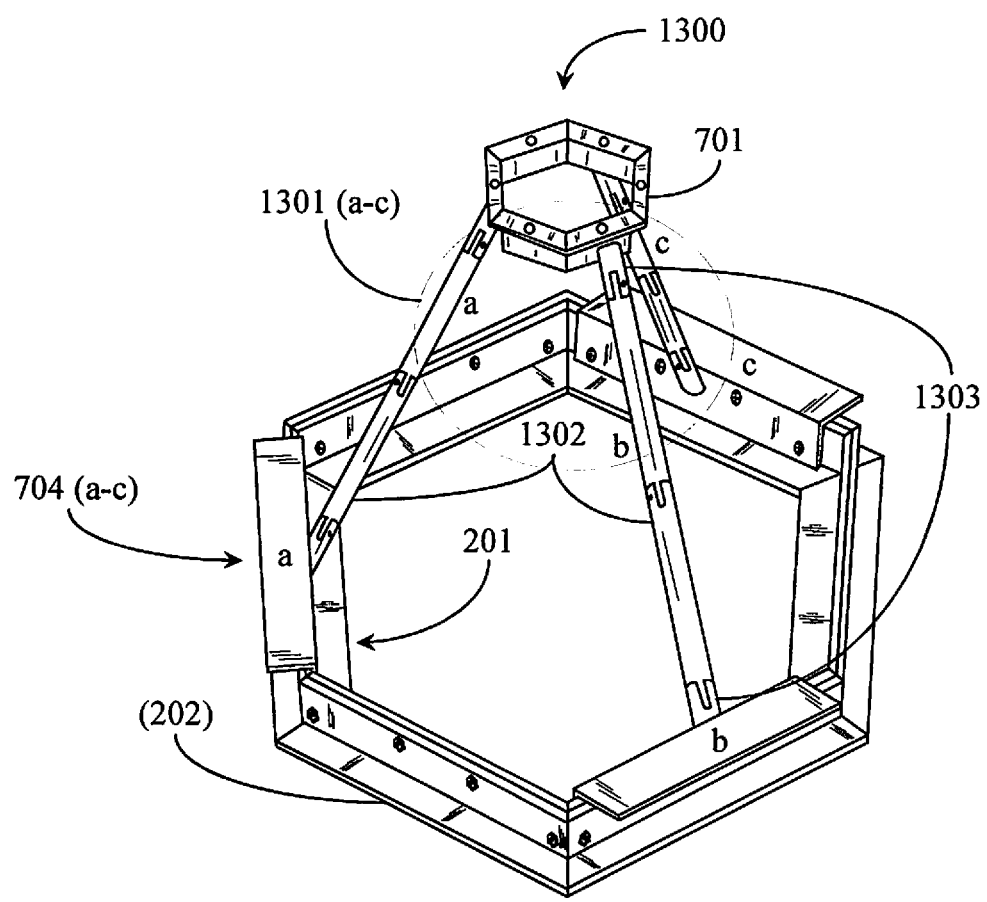
FIG. 13A is a perspective view of a collapsible truss hub extension fixture fully extended and locked in position according to an embodiment of the present invention.

FIG. 13A is a perspective view of a collapsible truss hub extension fixture 1300 fully extended and locked in position according to an embodiment of the present invention. Referring now to FIG. 13A, a collapsible truss hub extension fixture 1300 is provided. In this implementation, the tripod legs are provided as shorter connected segments of steel tubing. Legs 1301 (a-c) are jointed legs that may be locked into a straight rigid position or be unlocked and disjointed to collapse. Each leg 1301 (a-c) includes four segments, longer center segments 1302 (two per leg) and short end segments 1303 (two per leg). Central leg segments 1302 (two per leg) are pivotally connected to one another and to each end segment 1303 (two per leg). There are three joints per leg in this embodiment.

Each joint interface may be articulated to straight and rigid and locked int a rigid and extended position using a friction lock mechanism such as a screw stop or a spring-loaded pin stop. A spring-loaded pin stop may also function as a release button to regain articulation and break the rigidity of the legs. to unlock the joints so they may be articulated down.

Figure 13B:
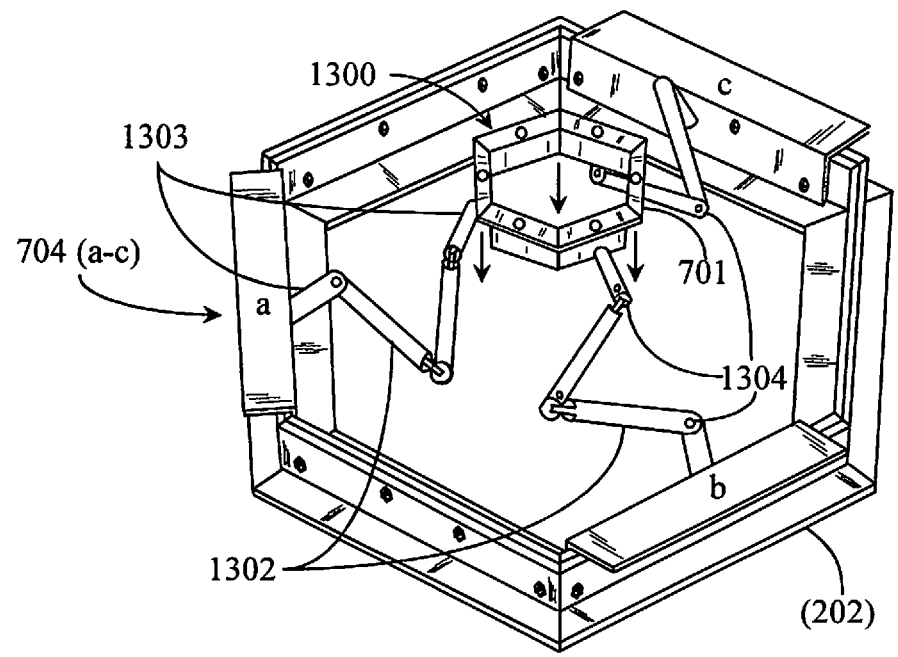
FIG. 13B is a perspective view of truss hub extension fixture of FIG. 13A in an unlocked and collapsed state for retraction into the cell footprint.

FIG. 13B is a perspective view of truss hub extension fixture 1300 in an unlocked and collapsed state for retraction into the cell footprint. In this implementation, the tripod legs are provided as shorter connectable segments of steel rod or tubing. Truss hub extension fixture 1300 is depicted in a collapsed state while still installed to the mounting cell 201. To collapse the fixture, a user may loosen the articulation joints 1304 on each of the tripod legs using a wrench such as an Allan wrench for example and may push hub 701 down in the direction of the arrows to collapse the fixture into the footprint of the cell 201 in the direction of the arrows. In this state, end segments 1303 are fixed to the extension mounting bracket mounted to the cell walls of the center and adjacent body cells as previously described above.

Articulation joints are available and known to the inventor including several different varieties that might be incorporated to enable the fixture legs to be broken down or collapsed in the direction of the arrows into the cell space. In this way, the assembly may remain in a mounted but collapsed state relative to the center cell and adjacent body cells (if left installed). Therefore, the center cell may be toted with minimum three adjacent body cells installed and the truss hub extension fixture installed but collapsed into the center cell space until ready to extend. Truss cables may also remain connected to the truss hub in this example and may also be rolled or looped up and stowed within the cell space. The truss cables (106) may include tensioning turn-buckles in this embodiment to enable final tensioning of the truss system.

The end segments for each jointed leg 1301 (a-c) may be angle cut whether square or rectangular tubing to achieve a flush weld to either the hub collar or an extension bracket.

The cut angle may be forty-five degrees or less depending on preferred truss angle. In this view just, the facets of the body cells are depicted for clarity of the installation. The truss hub extension FIG. 1300 is analogous to fixture 105 of FIG. 1 except for the jointed legs that may be erected and locked and unlocked and articulated to collapse. In this view it may be seen that the hardware for assembling the platform frame 102 and installing the truss extension fixture is nut and screw/bolt hardware. In one embodiment, the truss hub extension fixture may remain installed to a platform body having a center cell 201 and a minimum of three body cells 202.

Figure 14:
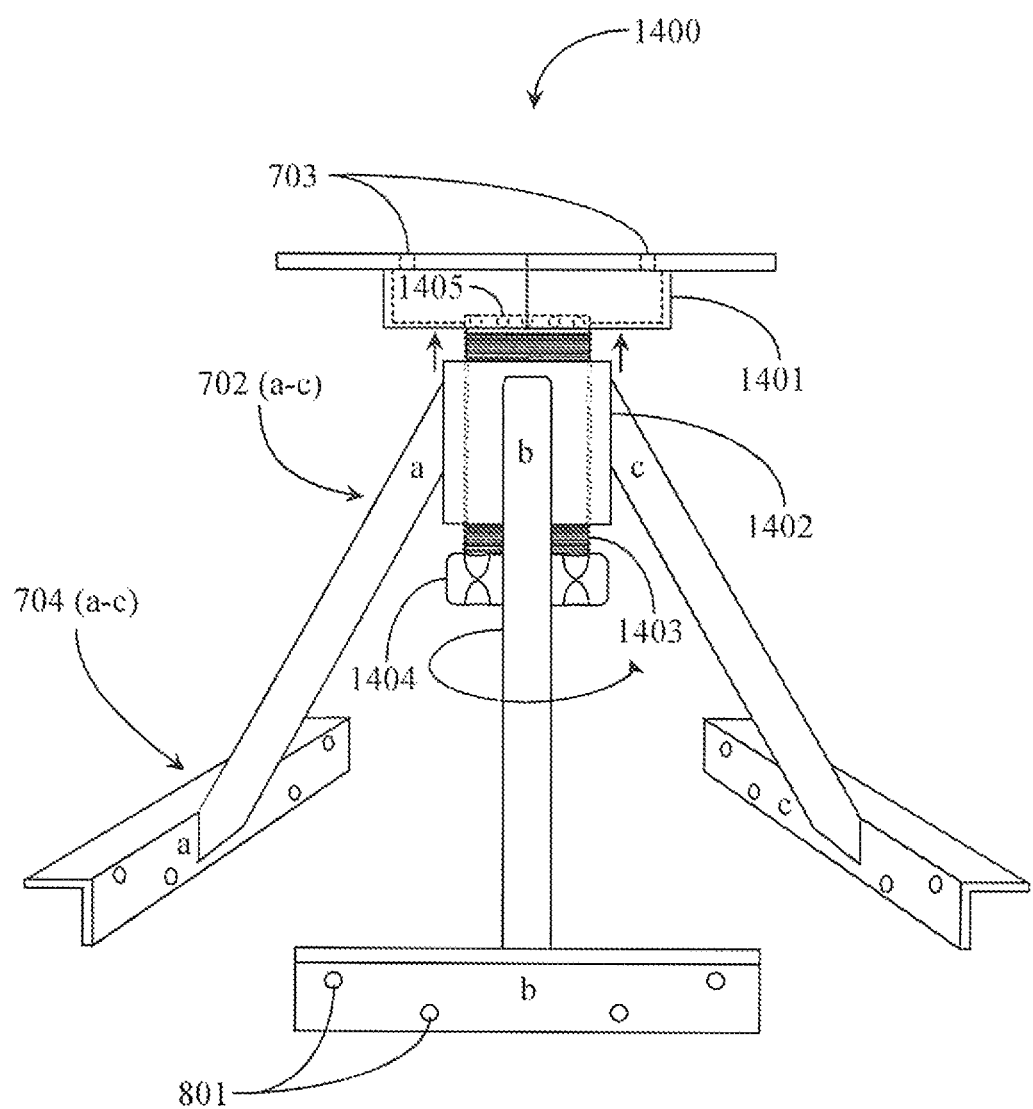
FIG. 14 is a front elevation view of a truss hub extension fixture that may be adjusted for height to tension connected trussing wires according to an embodiment of the present invention.

FIG. 14 is a front elevation view of a truss hub extension fixture 1400 that may be adjusted for height to tension connected trussing wires according to an embodiment of the present invention. Truss hub extension fixture 1400 includes three extension legs 702 (*a-c*). In this embodiment, extension legs 702 (*a-c*) may be assumed to be rectangular cut lengths of tubing angle cut at each end for achieving a flush weld to mounting brackets 704 (*a-c*) and to a threaded collar 1402. In this embodiment, a truss hub 1401 is rotably mounted at center top of a male threaded turn post 1403 that may be threaded into the female threading on the inside diameter of collar 1402.

Legs 702 (*a-c*) are welded to or otherwise fixed to center collar 1402. The threaded collar 1402 functions as a fixed center piece of truss hub extension fixture 1400. Threaded collar 1402 may be fabricated from steel tubing having a nominal wall thickness of three sixteenth of an inch or so and approximately three inches or so in diameter. Collar 1402 may include female threading disposed about the inside diameter breaking out at each end of the collar. Turn post 1403 is provided having external male threading disposed about the outside surface for mating and threading into fixed collar 1402 as depicted herein. It may be assumed herein that threaded collar 1402 has a hexagonal profile to provide six facets for welding or bolting extension legs onto.

Turn post 1403 includes a turn handle 1404 fixed at the lower end of the post substantially centered thereon. Turn handle 1404 may include a grip or knurled surface and may be fabricated from steel, aluminum, or another suitable handle material. Turn post 1403 includes a rotable bearing plate 1405 fixed onto the upper end of the post. Bearing plate 1405 is freely rotable and may serve as a bottom plate for truss hub 1401. In this way, truss hub 1401 may be oriented by the trussing cables (106, FIG. 1) that are attached to the corner anchor bars (not illustrated). Bearing plate 1405 may utilize stainless steel lubricated bearings. Truss hub 1401 may freely rotate about turn post 1403 in either direction.

A user may attach the trussing wires to truss hub 1401 and to respective anchor holes on the anchor bars (104, FIG. 1) at the corners of the platform (101, FIG. 1). The user may then tension all the trussing wires simultaneously by turning turn post 1403 via handle 1404 in the direction of the turn arrow to raise truss hub 1401 in the direction of the arrows to a position that achieves the tensioning force (goal) of the user in tensioning the trussing wires. A thread lock device or a turn lock mechanism may be provided (not illustrated) to turn post 1403 that will enable the user to lock the height adjustment position so that tension in the cables does not change or relax due to inadvertent shift or reverse of the threaded height position.

In this example, truss extension fixture 1400 may be dis-assembled by a user if required, for example by removing hub 1401 and bearing plate 1405 as one-piece, unscrewing post 1403 from collar 1402, and unbolting (if bolted and not welded) the legs from the collar 1402 and stowing the pieces within the footprint of the center cell space. It is noted herein that mounting corner brackets 704 (*a-c*) may remain installed through the vertical walls of the center cell without requiring adjacent cells to be installed. A user would simply unbolt the brackets and re-bolt them during installation of the adjacent cells.

It will be apparent to one with skill in the art of modular construction that a trussed and suspended platform may be packed into an area and assembled on site with simple tools. It will also be apparent that a set pattern of posts may be erected to define a camping site that a modular trussed platform of the invention may be suspended between. The trussed modular platform may also be packed disassembled into a suitable tree crown having a desired number of limbs for suspending the platform, wherein the user may assemble and suspend the platform. A modular trussed platform may be used as a tent site, a hunting platform, a tree shelter, a look out shelter, a storage platform, without departing from the spirit and scope of the present invention.

It will be apparent to one with skill in the art that the modular trussed platform of the invention may be provided using some or all the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A modular planar platform comprising:
   a plurality of platform cells, each cell having a polygon shape with top, bottom and edge sides, each cell configured for attachment with one or more adjacently placed cell using attachment hardware, any one of the cells being from the group consisting of center, body, edge, and corner platform cells;
   a plurality of anchor bars attached with any one or more of the cells;
   a truss hub extension having a collar and a plurality of support legs, each leg having at least two ends and is attached at a first end to the collar and a second end to the bottom side of one or more platform cells;
   one or more truss wires for attachment on the collar and one or more anchor bars; and
   wherein the truss hub extension is centrally disposed below the plurality of platform cells.

2. The modular planar platform of claim 1, wherein each of the support legs of the truss hub extension is segmented and collapsible via pivoted joints separating each segment.

3. The modular planar platform of claim 1, wherein each of the support legs of the truss hub extension are attached to fixture mounting brackets at the end opposite the collar allowing for secure attachment with the bottom side of the one or more platform cells.

4. The modular planar platform of claim 1, wherein each of the support legs of the truss hub extension have a mounting bracket at the end opposite the collar allowing for secure attachment with the bottom side of the one or more platform cells.

5. The modular planar platform of claim 1, wherein one or more of the support legs of the truss hub extension are attached to a mounting ring at the second ends of the one or more support legs opposite the collar allowing for secure attachment with the bottom side of the one or more platform cells.

6. The modular planar platform of claim 1, wherein the collar of the truss hub extension includes a flange providing one or more attachment sites for attaching the one or more truss wires.

7. The modular planar platform of claim 1 having a hexagonally shaped center cell.

8. The modular planar platform of claim 1 wherein the collar of the truss hub extension is hexagonally shaped.

9. The modular planar platform of claim 1 having a center cell having straight edges and a collar having corresponding straight edged, wherein each of the support legs is attached on the first end to a straight edge of the center cell and on the second end to a corresponding straight edge of the collar.

10. The modular planar platform of claim 1, the truss hub extension having three support legs.

11. The modular planar platform of claim 1, the truss hub extension having six support legs.

12. The modular planar platform of claim 1 having a center cell connected with adjacently placed edge cells forming a hexagonal outside platform edge.

13. The modular planar platform of claim 1 having a center cell connected with adjacently placed body cells and the body cells connected with adjacently placed edge cells forming a hexagonal outside platform edge.

14. The modular planar platform of claim 1 including tensioning turnbuckles to enable adjustable tensioning of the truss wires.

15. The modular planar platform of claim 1 wherein the collar of the truss hub extension may be adjusted for height to tension connected truss wires.

16. The modular planar platform of claim 1 wherein the inside diameter of the collar of the truss hub extension is threaded and rotatably mounted on a threaded turnpost and the turnpost is connected with each of the support legs.

17. The modular planar platform of claim 1 having a turnpost for adjusting the tension of truss wires wherein the turnpost includes a turn handle for adjusting the height of the collar of the truss hub extension.

18. The modular planar platform of claim 1 wherein each adjacently placed cell has a vertical frame edge with corresponding holes for securing connection hardware.

19. The modular planar platform of claim 1 wherein each of the anchor bars includes at least one truss wire anchor opening.

20. The modular planar platform of claim 19 wherein each of the anchor bars includes at least one suspension cable anchor opening enabling attachment of suspension cables to suspend the platform.

* * * * *